(12) United States Patent
Patterson et al.

(10) Patent No.: US 10,406,983 B1
(45) Date of Patent: Sep. 10, 2019

(54) VEHICLE BODY STRUCTURE

(71) Applicant: Nissan North America, Inc., Franklin, TN (US)

(72) Inventors: Ian Patterson, Novi, MI (US); Martin Petersen, Canton, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 15/900,627

(22) Filed: Feb. 20, 2018

(51) Int. Cl.
*B60R 3/00* (2006.01)
*B60R 3/02* (2006.01)
*B62D 33/03* (2006.01)

(52) U.S. Cl.
CPC ............... *B60R 3/02* (2013.01); *B62D 33/03* (2013.01)

(58) Field of Classification Search
CPC ........... B60R 3/02; B60R 3/007; B60R 3/005; B62D 33/03
See application file for complete search history.

(56) References Cited

U.S. PATENT DOCUMENTS

| | | | |
|---|---|---|---|
| 5,205,603 A | 4/1993 | Burdette, Jr. | |
| 6,170,843 B1 * | 1/2001 | Maxwell | B60R 3/02 182/91 |
| 7,175,377 B2 | 2/2007 | Womack et al. | |
| 7,229,116 B1 | 6/2007 | Bruford et al. | |
| 7,401,798 B2 | 7/2008 | Dolan | |
| 7,530,619 B1 | 5/2009 | Bruford et al. | |
| 7,617,571 B2 | 11/2009 | Lee et al. | |
| 7,954,836 B2 | 6/2011 | Mann | |
| 8,251,423 B1 | 8/2012 | Lingle | |
| 8,393,657 B1 | 3/2013 | Duderstadt | |
| 8,678,457 B1 | 3/2014 | Duderstadt | |
| 2002/0125677 A1 * | 9/2002 | Knodle | B60R 3/02 280/166 |
| 2004/0217573 A1 * | 11/2004 | Foster | B60R 3/005 280/166 |
| 2007/0096422 A1 | 5/2007 | Dolan | |
| 2008/0067775 A1 * | 3/2008 | DiCarlo | B60R 3/007 280/166 |
| 2017/0320419 A1 | 11/2017 | Gobart | |

* cited by examiner

*Primary Examiner* — Hau V Phan
(74) *Attorney, Agent, or Firm* — Global IP Counselors, LLP

(57) ABSTRACT

A vehicle body structure has a cargo area structure, a retractable step and a handle assembly. The cargo area structure has a floor, a first side wall and a tailgate at least partially defining a cargo area. The retractable step is installed to the cargo area structure beneath the floor and the first side wall and adjacent to the tailgate. The handle assembly has a base and a grip handle fixedly attached to the base. The base is attached to the first side wall with a portion of the base overlaying a corresponding portion of the upper surface of the first side wall and with an attachment assembly extending through the at least one opening in upper surface of the first side wall with a first portion of the grip handle extending inboard over the floor of the cargo area.

20 Claims, 18 Drawing Sheets

VEHICLE BODY STRUCTURE

BACKGROUND

Field of the Invention

The present invention generally relates to a vehicle body structure that includes a retractable step and a handle assembly. More specifically, the present invention relates to a vehicle body structure that includes a retractable step and a handle assembly where the handle assembly is fixedly attached to an upper area of a side wall of a pickup truck cargo area such that an individual using the step holds the handle assembly to aid in climbing up to the cargo area.

Background Information

Pickup truck cargo areas are usually at least two feet or more above ground level. Various step structures and handle devices have been proposed for assisting an individual when climbing up into the cargo area. However, most current handle devices are difficult to install and use, and, many take up valuable space within the cargo area.

SUMMARY

One object of the current disclosure is to provide a cargo area of a vehicle with a handle assembly that installs to a side wall of the cargo area and occupies a minimal amount of space within the cargo area at a location spaced apart and above a floor of the cargo area.

In view of the state of the known technology, one aspect of the present disclosure is to provide a vehicle body structure with a cargo area structure, a retractable step and a handle assembly. The cargo area structure has a floor, a first side wall and a tailgate at least partially defining a cargo area. The tailgate is movable between an open orientation exposing a rear end of the cargo area and a closed orientation blocking the rear end of the cargo area. The retractable step is installed to the cargo area structure beneath the floor and the first side wall and adjacent to the tailgate. The handle assembly has a base and a grip handle fixedly attached to the base. The base is attached to the first side wall with a portion of the base overlaying a corresponding portion of the upper surface of the first side wall and with an attachment assembly extending through the at least one opening in upper surface of the first side wall with a first portion of the grip handle extending inboard over the floor of the cargo area. An individual using the step to enter the cargo area grabs the grip handle for assistance in stepping up into the cargo area.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
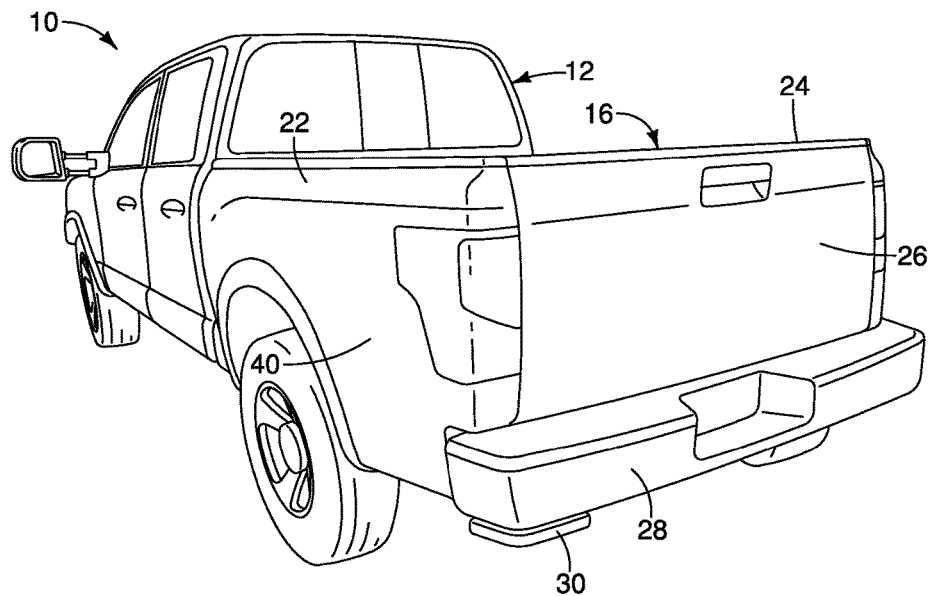
FIG. 1 is a rear perspective view of a vehicle that includes a cargo area structure, a bumper, a tailgate, a retractable step and a handle assembly, showing the tailgate in a closed orientation covering a rear end of the cargo area structure and showing the step in a retracted orientation beneath a rear corner of the bumper in accordance with the various embodiments.
Figure 2:
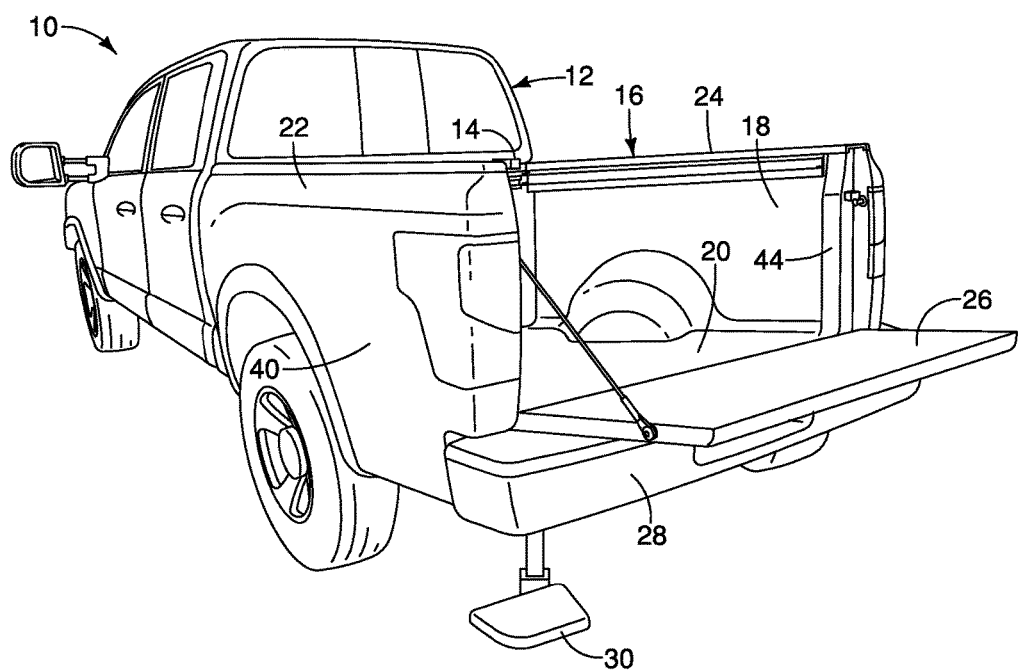
FIG. 2 is another rear perspective view of the vehicle similar to FIG. 1, showing the tailgate in an open orientation exposing a cargo area defined by the cargo area structure, and showing the step in an extended orientation extending rearward and laterally outboard relative to the bumper with the handle assembly being located above the rear corner of the bumper and the step, in accordance with the various embodiments.

Referring initially to FIGS. 1 and 2, a vehicle 10 has a vehicle body structure 12 that includes a handle assembly 14 used to step up into a cargo area structure 16 of the vehicle 10, is illustrated in accordance with a first embodiment. A cargo area 18 is defined within the cargo area structure 16.

In FIGS. 1 and 2, the vehicle body structure 12 of the vehicle 10 defines a pick-up truck design. Alternatively, the vehicle body structure 12 of the vehicle 10 can define any of a variety of vehicle designs that includes a cargo area that an individual might step up into in order to access, load or remove cargo within the cargo area.

The cargo area structure 16 of the vehicle 10 includes a floor 20, a first side wall 22, a second side wall 24, a tailgate 26, a bumper 28 and a step 30 installed beneath the floor 20 and the bumper 28 of the vehicle 10. The cargo area 18 is defined between the first side wall 22 and a second side wall 24 above the floor 20.

The first side wall 22 and the second side wall 24 extend upward along opposing outboard sides of the floor 20, defining a rear opening 32 therebetween. The tailgate 26 is pivotally attached to each of the first side wall 22 and the second side wall 24 such that the tailgate 26 is movable between an open orientation (FIG. 2) exposing the rear opening 32 of the cargo area structure 16 and a closed orientation (FIG. 1) blocking the rear opening 32 of the cargo area structure 16. Since tailgates, such as the tailgate 26, are conventional pickup truck features, further description is omitted for the sake of brevity.

The bumper 28 is fixedly attached to the vehicle body structure 12 in a conventional manner, such as mechanical fasteners or welding techniques. The bumper 28 extends laterally from respective a rear end the first side wall 22 to the rear end of the second side wall 24. The bumper 28 is located beneath the rear opening 32 of the cargo area structure 16 such that the tailgate 26 can freely move relative to the bumper 28 between the open orientation (FIG. 2) and the closed orientation (FIG. 1).

The retractable step 30 installed to the cargo area structure 16 at a location beneath the floor 20 and beneath a rear end of the first side wall 22, adjacent to the tailgate 26. More specifically, the retractable step 30 can be fixedly attached to a chassis (not shown) of the vehicle body structure 12, to elements of the floor 20 of the cargo area structure 16, or to the bumper 28. The retractable step 30 is movable from a retracted orientation shown in FIG. 1 to an extended orientation shown in FIG. 2. In the retracted orientation, the step 30 is partially concealed below the floor 20, the bumper 28 and the first side wall 22. In the extended orientation, the step 30 extends rearward and outboard away from the bumper 28 and relative to the cargo area 18. The retractable step 30 can include a telescoping structure, a pivoting structure, an articulated arm structure or a track and sliding step support structure (not shown) that enables the step 30 to move to and from the extended orientation (FIG. 2) underneath a rear corner of the bumper 28 and the retracted orientation (FIG. 1) in which the step 30 extends rearward from and laterally outboard of the rear corner of the bumper 28. Retractable steps, such as the step 30, are conventional structures. Consequently, further description is omitted for the sake of brevity.

Further, it should be understood from the drawings and the description hereinbelow, that the retractable step 30 can include any of a variety of designs and structures, such as a retractable step attached to or attachable to the first side wall 22 and/or the tailgate 26.

The first side wall 22 and the second side wall 24 are symmetrically constructed (mirror images of one another) but are otherwise structurally identical. Only the first side wall 22 will be described below for the sake of brevity. However, it should be understood from the drawings and the description herein that the description of the first side wall 22 applies equally to the second side wall 24.

Figure 3:
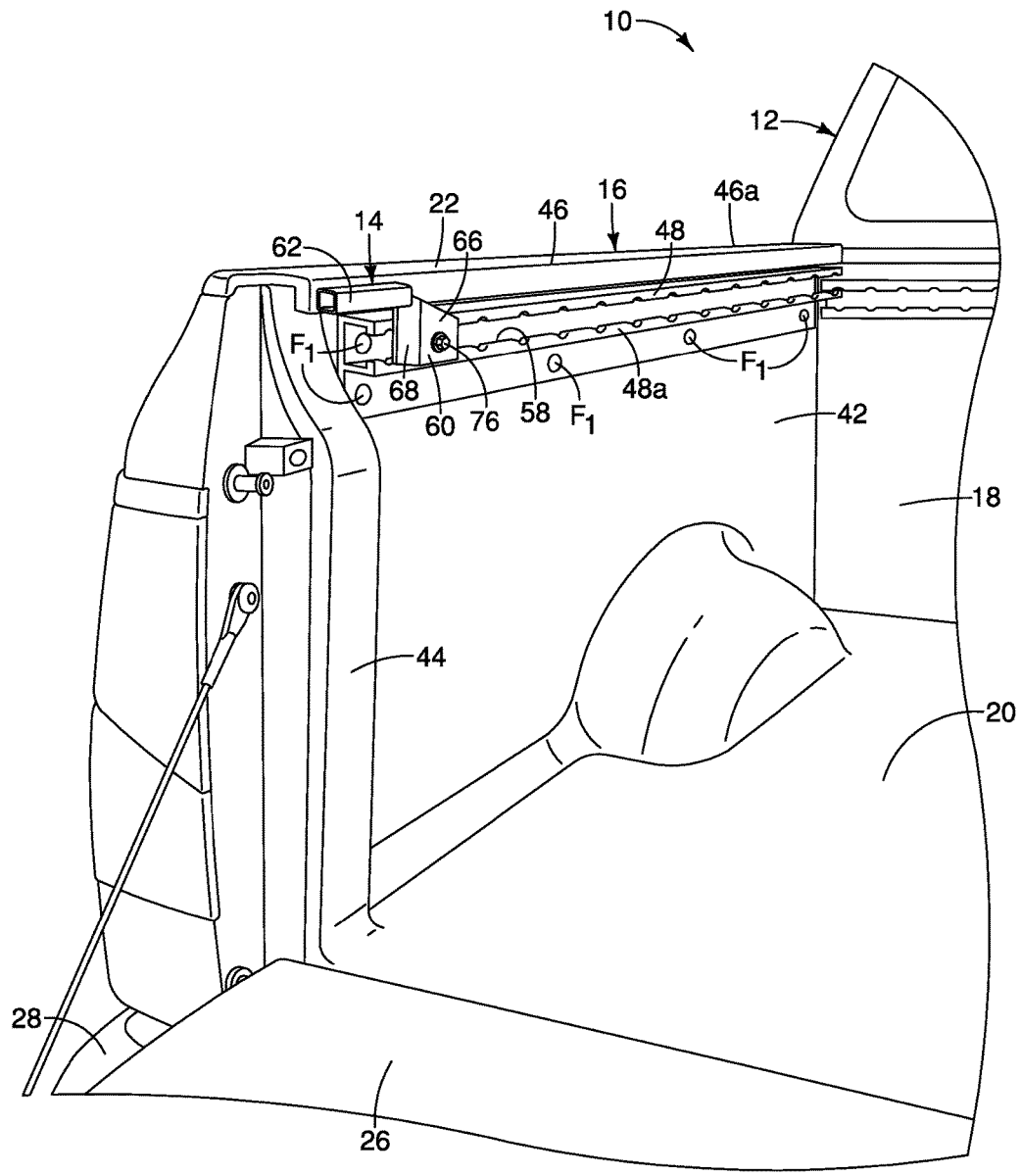
FIG. 3 is a rear perspective view of the cargo area structure showing a first side wall having a utility track installed along an upper area of the first side wall and a handle assembly removably installed to a rear end of the utility track in accordance with a first embodiment.

The first side wall 22 includes an outer panel 40 shown in FIGS. 1 and 2, an inner panel 42, a support pillar 44 and an upper panel portion 46 that are shown in FIG. 3. The outer panel 40 is contoured in accordance with an overall exterior design of the cargo area structure 16 and can have any of a variety of contours and/or shapes, or can have a simple flat or near flat shape. The inner panel 42 can also be contoured and shaped in accordance the cargo area structure 16 design. However, in the depicted embodiment, the inner panel 42 is generally flat and planar extending perpendicularly upward from the floor 20, except in the area of the wheel well.

Figure 10:
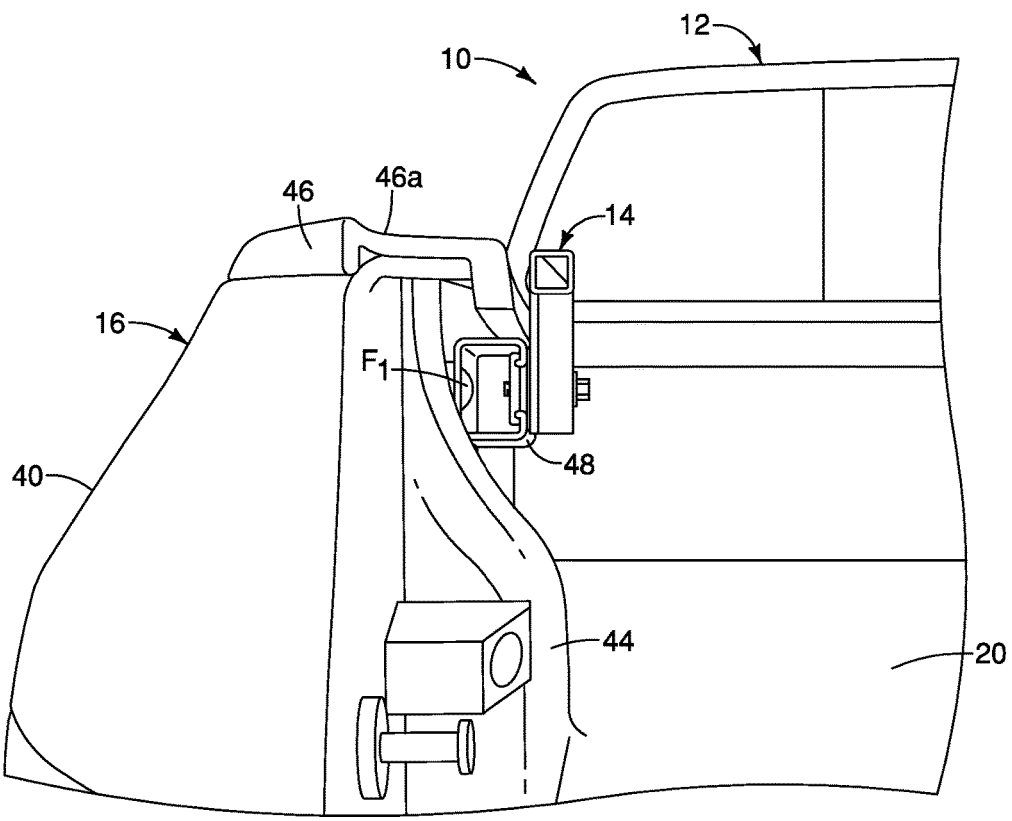
FIG. 10 is an end view of the first side wall of the cargo area structure showing the handle assembly installed to the rear end of the utility track with the attachment assembly clamped to the utility track in accordance with the first embodiment.
Figure 11:
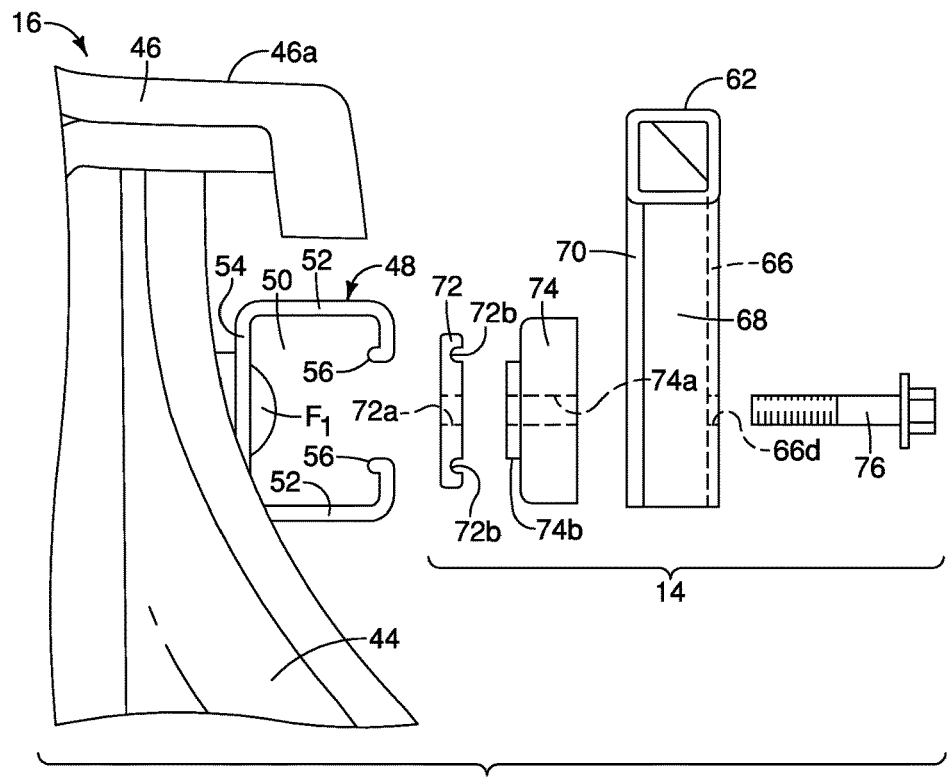
FIG. 11 is an exploded end view of the first side wall and the handle assembly showing the base and elements of the attachment assembly separated from one another and separated from the utility track in accordance with the first embodiment.
Figure 12:
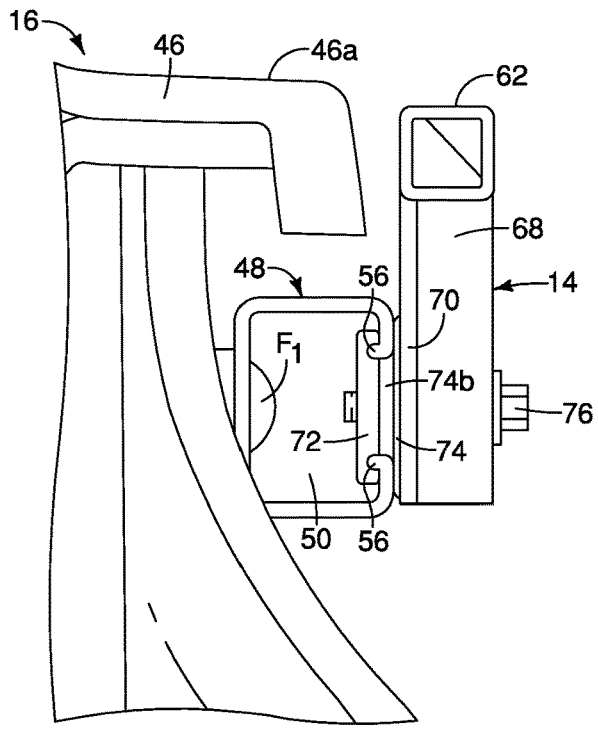
FIG. 12 is another end view of the first side wall of the cargo area structure showing the handle assembly installed to the rear end of the utility track with the attachment assembly clamped to the utility track in accordance with the first embodiment.

The upper panel 46 is horizontally oriented and extends in a vehicle lateral inboard direction from an upper end of the outer panel 40. As shown in FIGS. 10, 11 and 12, the upper panel 46 overhangs an upper end of the inner panel 42. The upper panel 46 further defines an upper surface 46a of the first side wall 22.

Each of the first side wall 22 and the second side wall 24 includes a utility track 48. As shown in FIGS. 3-5 and 10-12, the utility track 48 is fixedly attached to the first side wall 22 immediately below the overhang of the upper panel 46. In other words, the upper panel 46 extends inboard over the utility track 48.

The utility track 48 is configured to receive and support cargo area accessories such as those disclosed in commonly assigned U.S. Pat. Nos. 9,623,787, 8,550,757, 8,408,853, 8,052,019 and 7,594,787, which are all incorporated herein by reference in their entirety. The utility track 48 is rigidly and fixedly attached to the first side wall 22 at a location below and adjacent to the upper surface 46a of the upper panel portion 46 of the first side wall 22.

Figure 4:
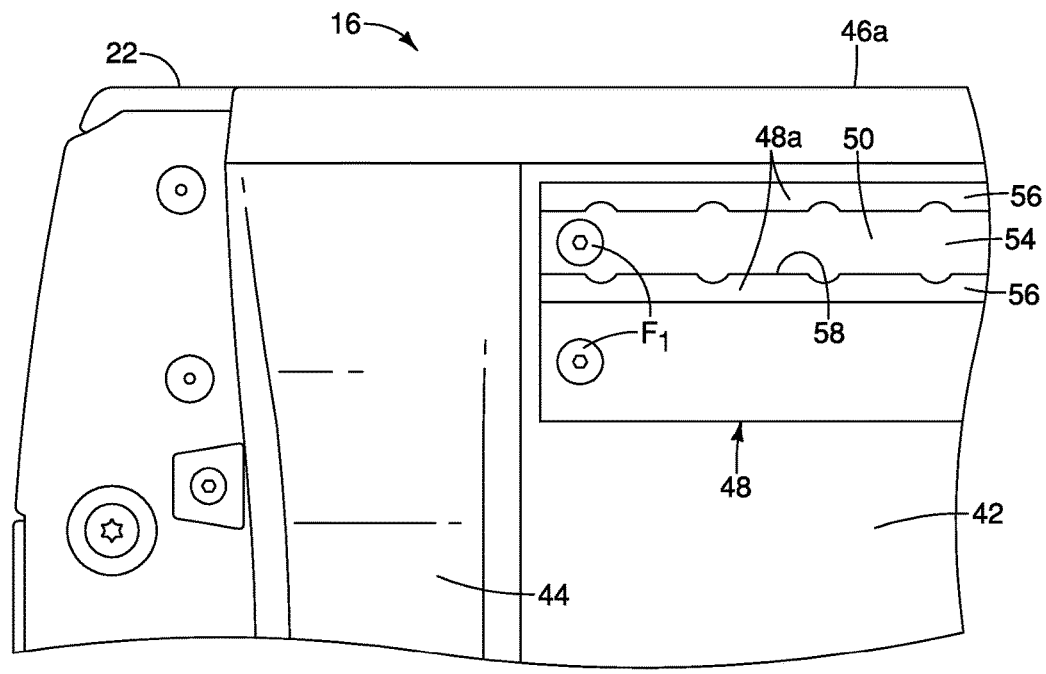
FIG. 4 is a side view of the first side wall of the cargo area structure showing the handle assembly removed from the utility track in accordance with the first embodiment.
Figure 5:
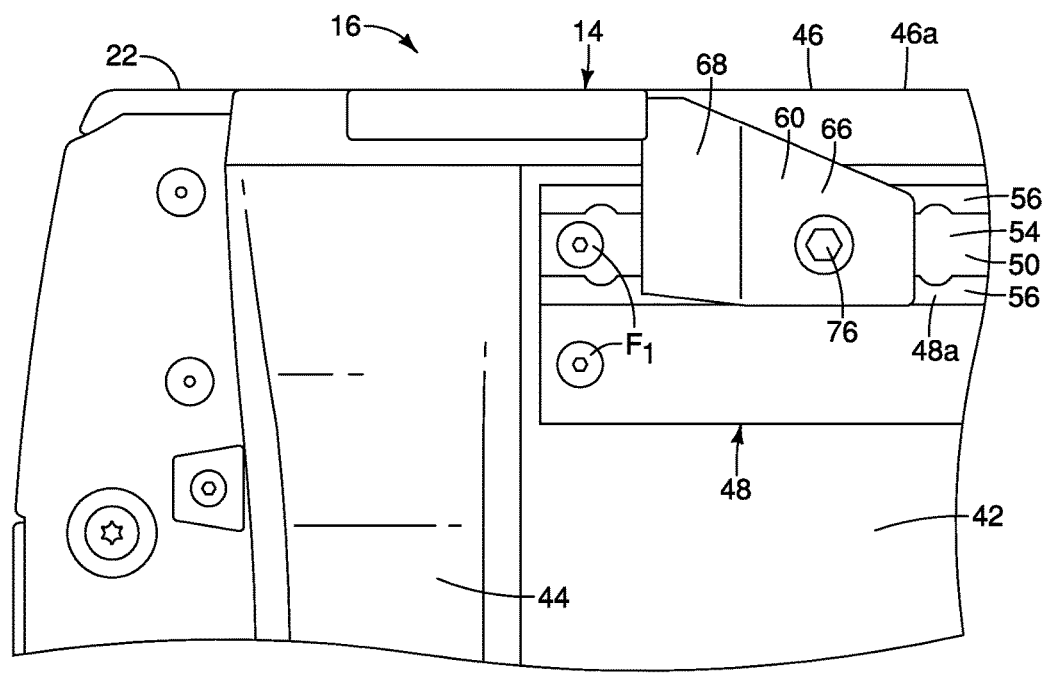
FIG. 5 is another side view of the first side wall of the cargo area structure similar to FIG. 4, showing the handle assembly installed to the rear end of the utility track in accordance with the first embodiment.
Figure 6:
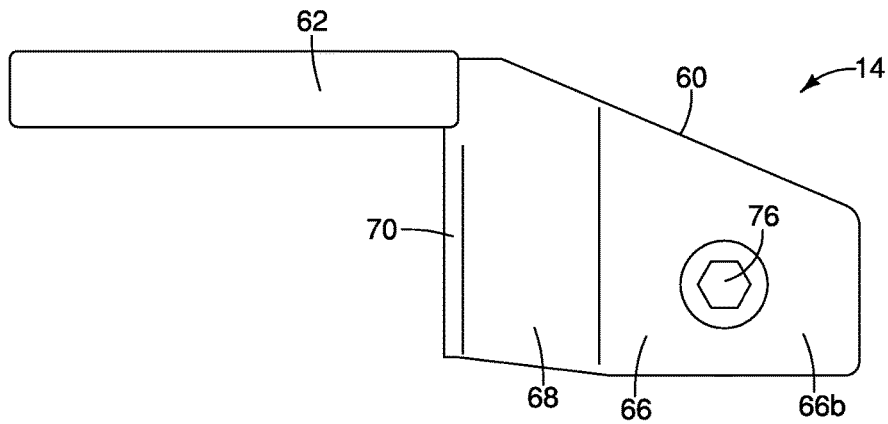
FIG. 6 is a side view of the handle assembly removed from the vehicle showing a base and a grip handle in accordance with the first embodiment.

The utility track 48 is fastened to the inner panel 42 of the first side wall 22 via a plurality of pairs of fasteners $F_1$, as shown in FIG. 4. Only one pair of fasteners $F_1$ is shown in FIG. 4. The depicted pair of fasteners $F_1$ are vertically aligned and spaced apart from one another.

The utility track 48 is an elongated member shown in cross-section in FIGS. 10, 11 and 12. The utility track 48 has a generally U-shaped configuration when viewed in cross-section. The U-shape of the utility track 48 defines an elongated hollow channel 50 (hereinafter referred to as the channel 50) surrounded on three sides by parallel walls 52 and base wall 54. Outer ends of the walls 52 are each formed with projections 56 that extend back into the channel 50. The ends of the projections 56 extend into the channel 50 but are spaced apart from the walls 52 and the base wall 54. An elongated opening 58 (a horizontally oriented gap) is defined between the projections 56 is open to the channel 50. Further, the rear end of the utility track 48 is open. The inboard vertical portions of the parallel walls 52 define an upright surface 48a. In other words, since the utility track 48 is fixed to the first side wall 22, the utility track 48 defines the upright surface 48a of the first side wall 22.

A description is now provided of the handle assembly 14 in accordance with a first embodiment with specific reference to FIGS. 3-12. The handle assembly 14 basically includes a base 60, a grip handle 62 and an attachment assembly 64.

The base 60 includes an attachment portion 66, a contoured portion 68 and a handle supporting portion 70. The attachment portion 66 is has an outboard surface 66a and an inboard surface 66b (relative to the vehicle 10 when installed to the first side wall 22). The outboard surface 66a includes a projection 66c. The projection 66c is an elongated flange that extends in an outboard direction perpendicular to the outboard surface 66a. The projection 66c is dimensioned and shaped to engage a surface of the attachment assembly 64 such that the projection 66c prevents pivoting of the base 60 relative to the attachment assembly 64, as described in greater detail below. Alternatively, the projection 66c can be inclined relative to the outboard surface 66a in order to mate with the surface of the attachment assembly 64, as described below.

The contoured portion 68 extends away from the attachment portion 66 such that the handle supporting portion 70 is located above and inboard of the attachment portion 66. The handle supporting portion 70 extends upward and away from the contoured portion 68 with the grip handle 62 being rigidly and fixedly attached to the handle supporting portion 70.

When installed to the utility track 48, the attachment portion 66 overlays the projections 56 of the utility track 48. More specifically, the outboard surface 66a of the attachment portion 66 of the base 60 overlays a portion of the upright surface 48a of the utility track 48.

The grip handle 38 is an elongated bar shaped member that can have a rectangular cross-section, or, can have a cylindrical shape. The grip handle 38 is fixedly attached the handle supporting portion 70 via, for example, mechanical fasteners or welding techniques. Further, the grip handle 38 extends in a rearward direction from the base 60, with the handle assembly 14 installed to the first side wall 22. With the base 60 attached to the upright surface 48a of the first side wall 22 and the overall shape of the base 60 is such that the grip handle 62 is positioned adjacent to and spaced apart from an upper surface 46a of the first side wall 22 within the cargo area 18, above the floor 20 and above the step 30. Consequently, an individual using the step 30 to enter the cargo area 18 grabs the grip handle 38 to assist in stepping up into the cargo area 18.

As shown in FIGS. 3, 10-12, the contoured portion 68 extends in an outboard direction from the attachment portion 66 of the base 60 of the handle assembly 14. Consequently, the attachment assembly 64 is at least partially concealed by the contoured portion 68 when viewed from a rear portion of the vehicle 10, as shown in FIGS. 3, 10-12.

The attachment assembly 64 is basically a clamping device that attaches to the attachment portion 66 of the handle assembly 14 and clamps to the utility track 48. As shown in FIGS. 11 and 12, the attachment assembly 64 includes a clamping member 72, a clamping block 74 and a threaded fastener 76. The clamping member 72 is a generally flat metallic member. The clamping member 72 basically includes a central threaded aperture 72a and a pair of grooves 72b formed on one surface thereof along opposite sides of the threaded aperture 72a. The grooves 76 are parallel to one another and are spaced apart from one another corresponding to the distance between the projections 56 of the utility track 48.

Figure 7:
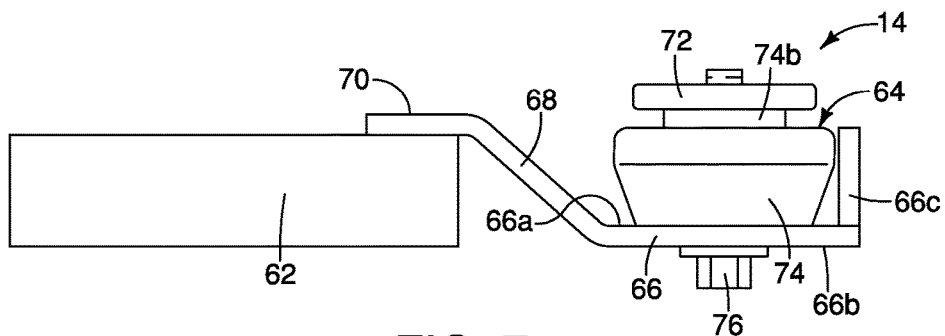
FIG. 7 is a top view of the handle assembly removed from the vehicle showing the base, the grip handle and an attachment assembly in accordance with the first embodiment.
Figure 8:
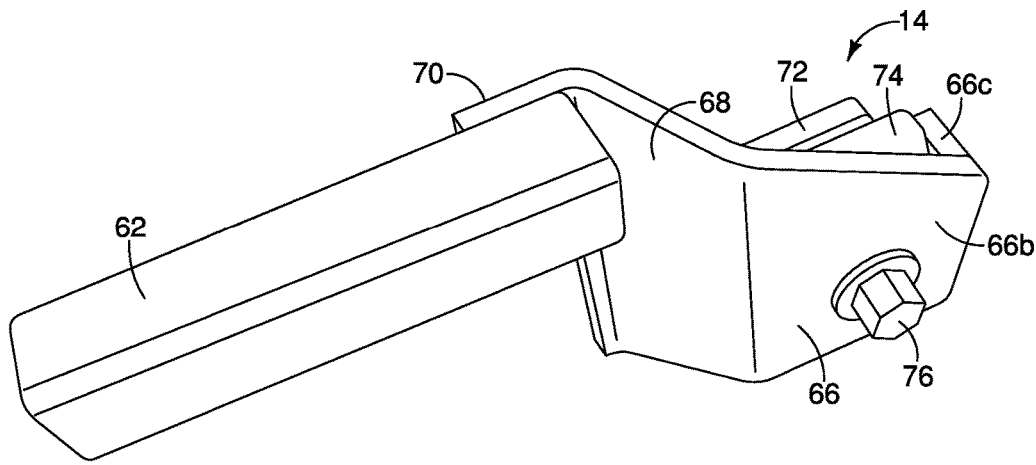
FIG. 8 is a perspective view of the handle assembly removed from the vehicle showing further details of the base, the grip handle and the attachment assembly in accordance with the first embodiment.
Figure 9:
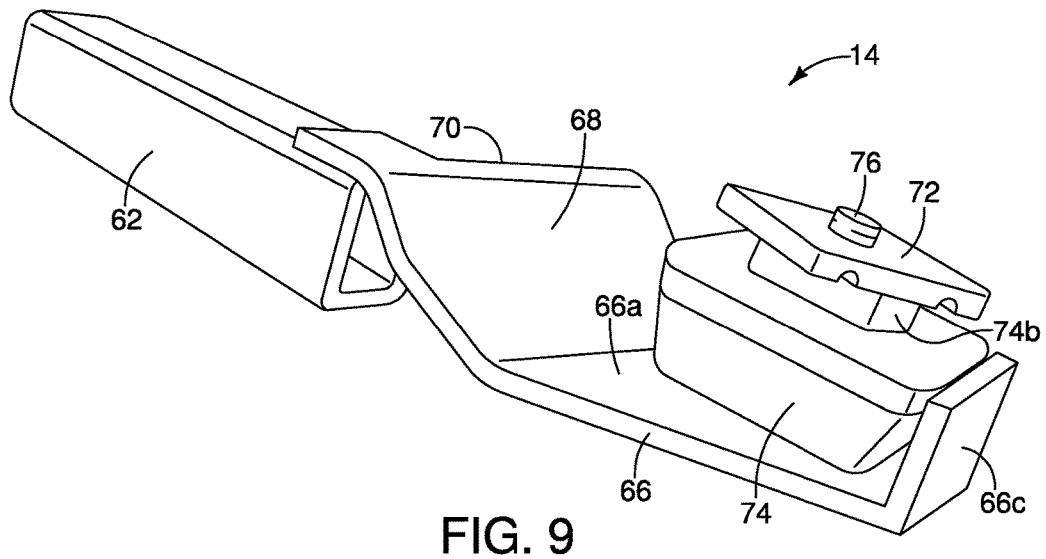
FIG. 9 is another perspective view of the handle assembly removed from the vehicle showing still further details of the base, the grip handle and the attachment assembly in accordance with the first embodiment.

As shown in FIGS. 11-12, the threaded fastener 76 is inserted through an aperture 66d defined by the attachment portion 66 of the base 60 of the handle assembly 14. The fastener 76 is further inserted through a bore 74a of the clamping block 74, thereafter threadedly engaged with the central threaded aperture 72a of the clamping member 72. As shown in FIG. 12, the clamping member 72 is inserted or slid into the channel 50 via the open end of the utility track 48. Thereafter the fastener 76 is tightened pulling the clamping member 72 closer to the clamping block 74 and the base 60. The projections 56 are located between the clamping member 72 and the clamping block 74 such that the clamping member 72 and the clamping block 74 clamp to the projections 56, locking the attachment assembly 64 and the handle assembly 14 in position to the utility track 48. Further, the projections 56 are retained with respective ones of the grooves 74 of the attachment assembly 64. As well, an anti-rotation block 74b extending from (and formed unitarily with) the clamping block 74 prevents the attachment assembly 64 has pivoting or rotating relative to the utility track 48. The anti-rotation block 74b has a square-shape dimensioned to snuggly fit into the elongated opening 58 of the utility track 48. Therefore, once the threaded fastener 76 is tightened clamping the attachment assembly 64 to the utility track 48, the anti-rotation block 74b is forced into the elongated opening 58. As shown in FIGS. 7, 8 and 9, the projection 66c formed on the attachment portion 66 of the base 60 contacts a surface of the clamping block 74 thereby preventing rotation or pivoting movement of the base 60 and the grip handle 62 relative to the attachment assembly 64 and the utility track 48.

Once installed to the utility track 48, the grip handle 62 of the handle assembly 14 extends in a direction parallel to the first side wall 22, as shown in FIGS. 10 and 12. Further, once installed to the utility track 48, the grip handle 62 of the handle assembly 14 is positioned such that with the tailgate 26 in the open orientation, an individual using the step 30 to enter the cargo area 18 grabs the grip handle 62 for assistance in stepping up into the cargo area 18 and/or stepping on to the tailgate 26.

The threaded fastener 76 has a hexagonal shaped head such that the threaded fastener 76 can be tightened or loosened using a conventional wrench. However, the hexagonal head can be replaced with a hand operated knob (not shown) such that a vehicle operator can install and remove the handle assembly 14 without the use of tools.

The handle assembly 14 is depicted in the drawings as being installed to a rear end of the utility track 48. It should be understood from the drawings and the description herein, that the handle assembly 14 can be installed to any of a variety of positions along the length of the utility track 48. Further, with the handle assembly 14 installed at the rear end of the utility track 48, other accessories (not shown) are retained for restricted movement along the length of the utility track 48 since the handle assembly 14 serves as an end stop for the utility track 48, preventing other accessories from being loosened and slid out the open end of the utility track 48. In other words, the handle assembly 14 closes the open end of the utility track 48 when installed thereto.

Second Embodiment

Figure 13:
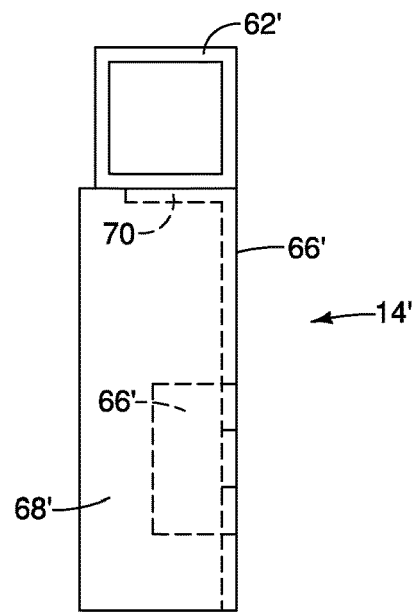
FIG. 13 is an end view of a handle assembly with the attachment assembly removed in accordance with a second embodiment.
Figure 14:
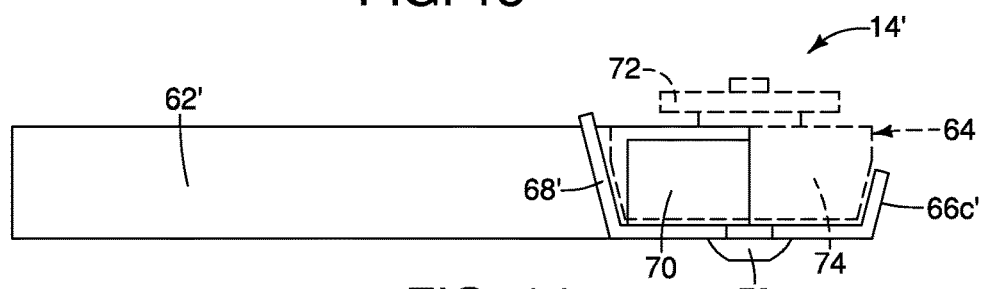
FIG. 14 is a bottom view of the handle assembly with the attachment assembly removed in accordance with the second embodiment.
Figure 15:
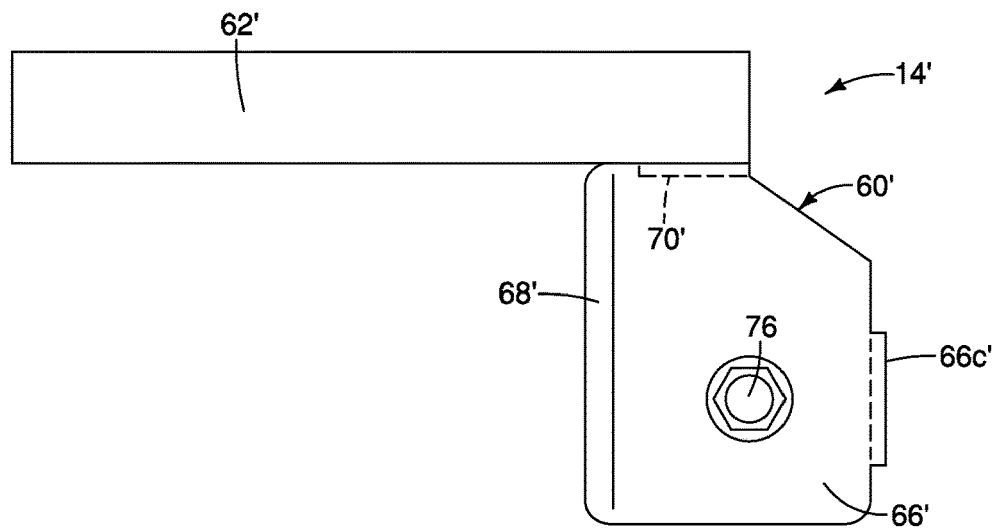
FIG. 15 is a side view of the handle assembly with the attachment assembly removed in accordance with the second embodiment.

Referring now to FIGS. 13, 14 and 15, a handle assembly 14' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The handle assembly 14' of the second embodiment is a modified version of the handle assembly 14 of the first embodiment. In the second embodiment, the handle assembly 14' includes a base 60' and grip handle 62'. The base 60' is similar to the base 60 of the first embodiment, but with slight modifications. Specifically, the base 60' includes an attachment portion 66', a contoured portion 68' and a handle supporting portion 70'. The attachment portion 66' of the base 60' is narrowed, as compared to the base 60 of the first embodiment. Further, the contoured portion 68' is also narrower that the contoured portion 68 of the first embodiment. Finally, the handle supporting portion 70' is smaller and narrower than the handle supporting portion 70 of the first embodiment such that the grip handle 62' is significantly longer than the grip handle 62 of the first embodiment. Also, the attachment portion 66' includes a projection 66c' that is inclined such that the projection 66c' contacts a greater surface area of the attachment assembly 64 (identical to that described in the first embodiment) thereby preventing pivoting or rotation of the base 60' relative to the attachment assembly 64 and the utility track 48.

With the handle assembly 14' installed to the utility track 48, the grip handle 62' is positioned such that with the tailgate 26 in the open orientation, an individual using the step 30 to enter the cargo area 18 grabs the grip handle 62' for assistance in stepping up into the cargo area 18 and/or stepping on to the tailgate 26.

Third Embodiment

Figure 16:
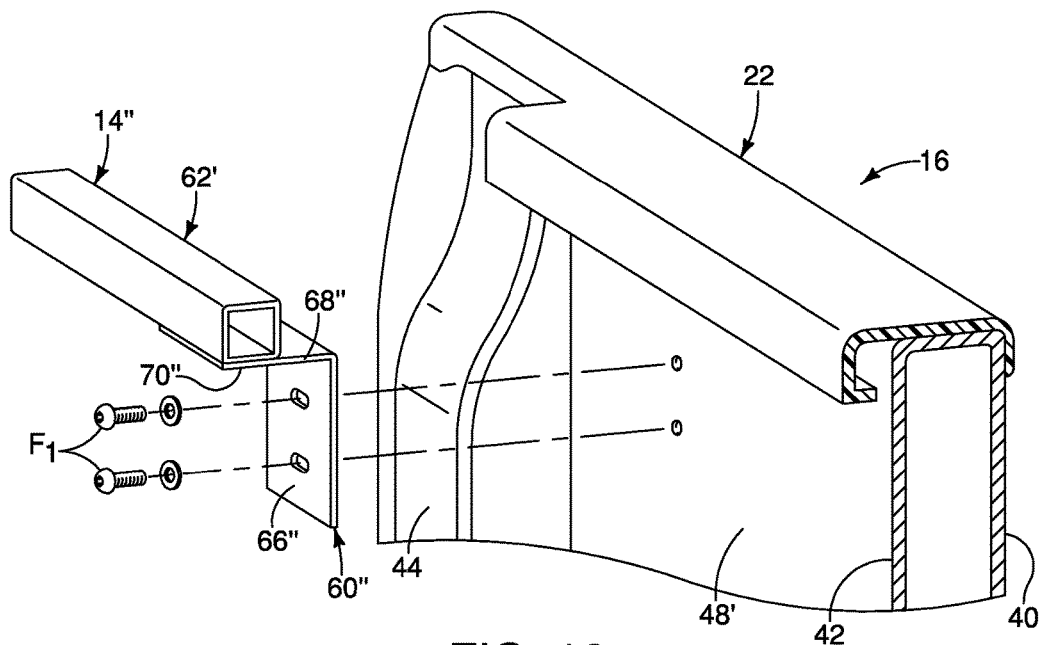
FIG. 16 is an exploded view of a handle assembly and the first side wall with the utility track removed, showing an attachment location on an inner panel of first side wall where the handle assembly mounts in accordance with a third embodiment.
Figure 17:
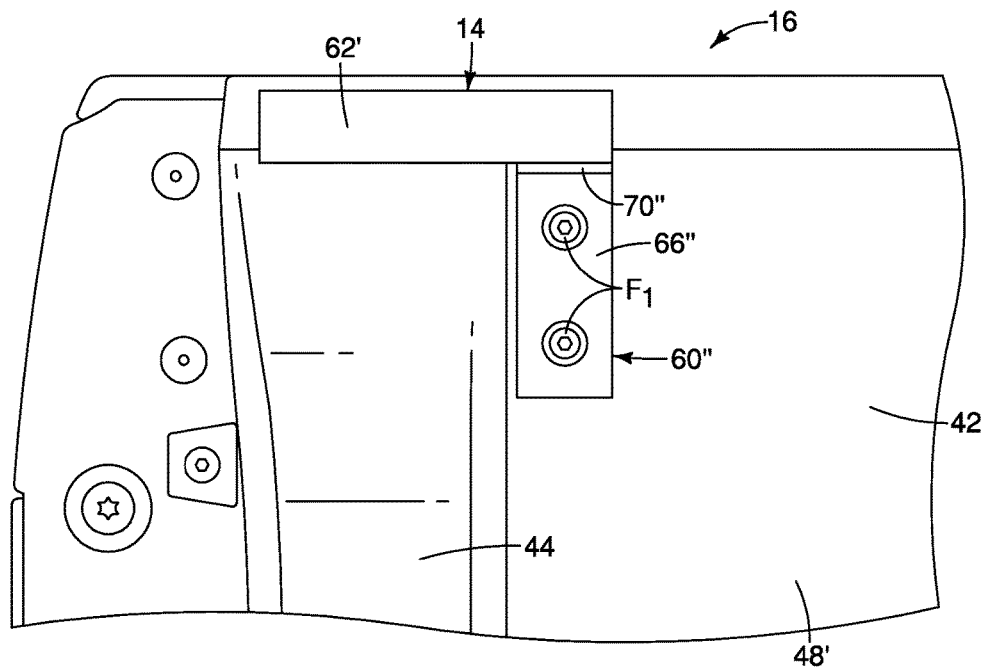
FIG. 17 is a side view of the first side wall and the handle assembly depicted in FIG. 16 showing the handle assembly installed to the inner panel of the first side wall on accordance with the third embodiment.

Referring now to FIGS. 16 and 17, a handle assembly 14" in accordance with a third embodiment will now be explained. In view of the similarity between the first, second and third embodiments, the parts of the third embodiment that are identical to the parts of the first and/or second embodiments will be given the same reference numerals as the parts of the first and/or embodiments. Moreover, the descriptions of the parts of the third embodiment that are identical to the parts of the first and/or embodiments may be omitted for the sake of brevity. The parts of the third embodiment that differ from the parts of the first and/or second embodiments will be indicated with a single prime (') or a double prime (").

In the third embodiment, the first side wall 22 is as described with respect to the first embodiment. In the third embodiment, the utility track 48 has been removed. Therefore, the inner panel 42 defines an upright surface 48'. Further, the handle assembly 14" of the third embodiment fastens directly to the inner panel 42 of the first side wall 22 via the fasteners $F_1$ overlaying a portion of the upright surface 48' of the first side wall 22.

The handle assembly 14" of the third embodiment is a modified version of the handle assembly 14' of the second embodiment. In the third embodiment, the handle assembly 14' includes a base 60" and the grip handle 62' of the second embodiment. The base 60" is similar to the base 60' of the second embodiment, but with slight modifications. Specifically, the base 60" includes an attachment portion 66", a contoured portion 68" and a handle supporting portion 70". The attachment portion 66" of the base 60' is narrowed, as compared to the base 60 of the first embodiment. Further, the contoured portion 68" extends from an upper end of the attachment portion 66", extends inboard from the attachment portion 66" and defines a 90-degree angle therebetween. The contoured portion 68" is also somewhat elongated. Specifically, the contoured portion 68" is dimensioned to position the grip handle 62' such that the grip handle 62' is spaced apart from the first side wall 22. A distal end of the contoured portion 68" defines the handle supporting portion 70". The grip handle 62' is welded or otherwise rigidly fixed to the handle supporting portion 70" and is significantly longer than the grip handle 62 of the first embodiment. Since there are two fasteners $F_1$ attaching the handle assembly 14" to the first side wall 22, the grip handle 62' cannot pivot or rotate relative to the first side wall 22.

With the handle assembly 14" installed to the upright surface 48' of the first side wall 22, the grip handle 62' is positioned such that with the tailgate 26 in the open orientation, an individual using the step 30 to enter the cargo area 18 grabs the grip handle 62' for assistance in stepping up into the cargo area 18 and/or stepping on to the tailgate 26.

Fourth Embodiment

Referring now to FIGS. 18-21, a handle assembly 114 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity. The parts of the fourth embodiment that differ from the parts of the first embodiment will be indicated with a single prime (').

In the fourth embodiment, the first side wall 22 is as described with respect to the first embodiment. In the fourth embodiment, the utility track 48 has been removed. Therefore, the inner panel 42 defines the upright surface 48'. Further, the handle assembly 114 of the fourth embodiment fastens directly to the inner panel 42 of the first side wall 22 via the fasteners $F_1$ overlaying a portion of the upright surface 48' of the first side wall 22.

Figure 20:
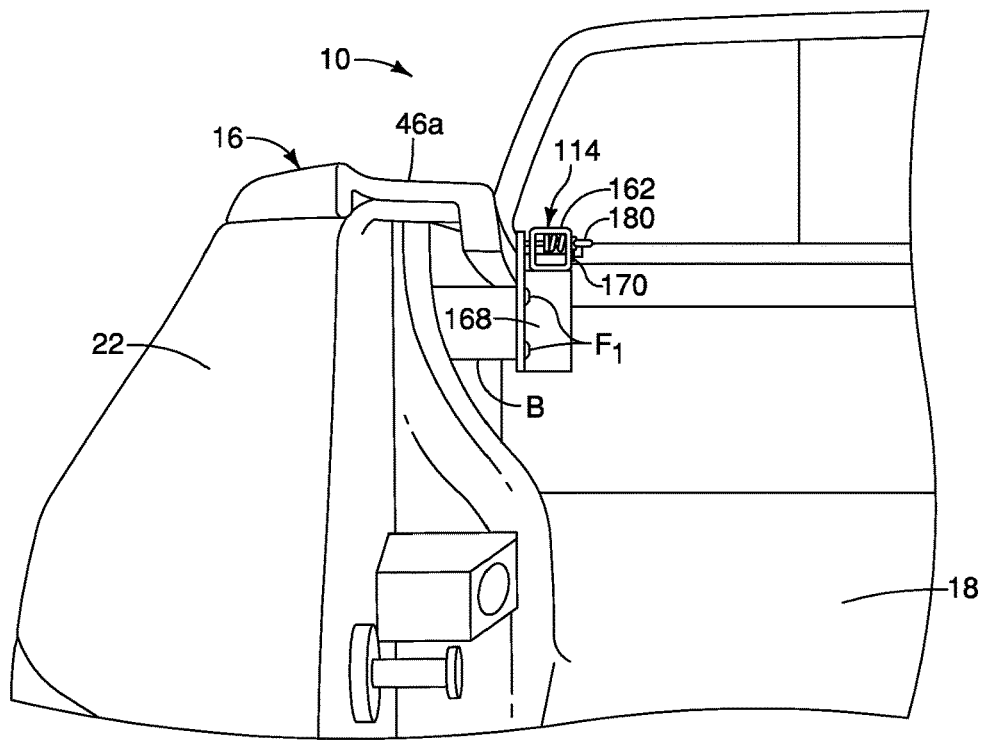
FIG. 20 is a rear view of the first side wall and the handle assembly showing the grip handle of the handle assembly pivoted to the stowed orientation in accordance with the fourth embodiment.
Figure 21:
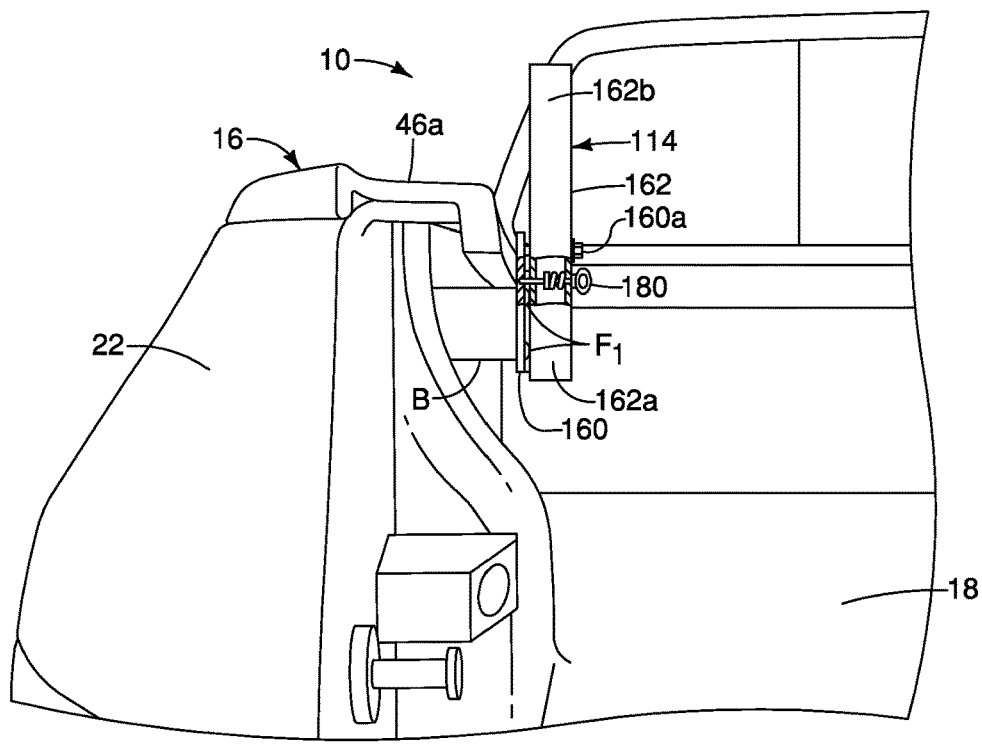
FIG. 21 is another end view of the first side wall and the handle assembly similar to FIG. 20, showing the grip handle of the handle assembly pivoted to the gripping orientation in accordance with the fourth embodiment.

The handle assembly 114 of the fourth embodiment includes a base 160 and a grip handle 162. The base 160 is a metallic member that includes an attachment portion 166, a first stop portion 168 and a second stop portion 170. The attachment portion 166 is a flat metallic plate that is attached to an upright surface 48' of the first side wall 22 above the floor 20 within the cargo area 18 via fasteners $F_1$. As shown in FIGS. 20 and 21, a block B or spacer can be located between the base 160 and the first side wall 22 to locate the grip handle 162 in a predetermined location. The first stop portion 168 and the second stop portion 170 that are positioned and oriented such that the grip handle 162 is limited to pivoting movement between the first stop portion 168 and the second stop portion 170. In the depicted fourth embodiment, the first stop portion 168 and the second stop portion 170 are perpendicular to one another, and, extend in directions perpendicular to the attachment portion 166.

The grip handle 162 is an elongated rod that pivots about a pivot shaft 160a fixed to the base 160. The grip handle 162 is movable (pivoting movement) relative to the base 160 between a stowed orientation (FIG. 18) in which the entire grip handle 162 is at a location lower than the upper surface 46a of the first side wall 22 and a gripping orientation (FIG. 19) in which at least a portion of the grip handle 162 extends higher that the upper surface 46a of the first side wall 22. With the grip handle 162 in the gripping orientation (FIG. 19), an individual using the step 30 to enter the cargo area 18 grabs the grip handle 162 for assistance in stepping up into the cargo area 18.

Figure 18:
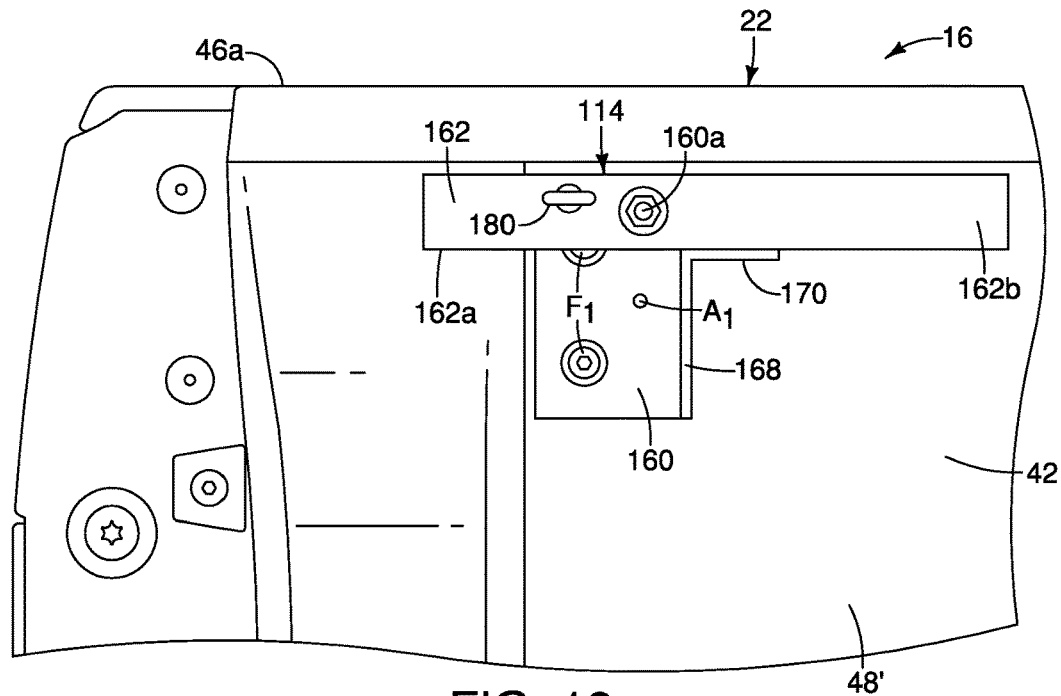
FIG. 18 is a side view of the first side wall (without the utility track) and a handle assembly showing the handle assembly installed to an inner panel of the first side wall and with a grip handle of the handle assembly pivoted to a stowed orientation in accordance with a fourth embodiment.
Figure 19:
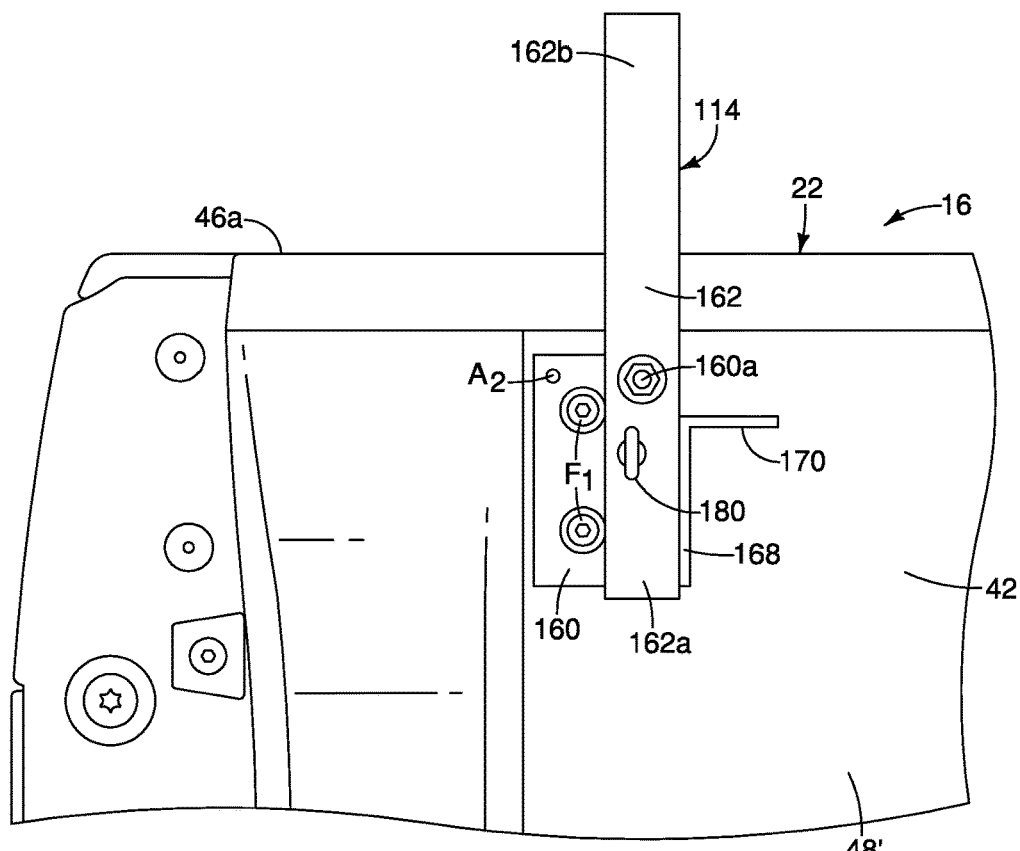
FIG. 19 is a side view of the first side wall (without the utility track) and the handle assembly similar to FIG. 18, showing the grip handle of the handle assembly pivoted to a gripping orientation in accordance with the fourth embodiment.

The first stop portion 168 is vertically oriented such that the grip handle 162 contacts the first stop portion 168 when in the gripping orientation (FIG. 19). The second stop portion 170 is horizontally oriented such that the grip handle 162 contacts the second stop portion 170 when in the stowed orientation (FIG. 18).

The first stop portion 168 and the second stop portion 170 are positioned such that the grip handle 162 is limited to approximately 90 degrees of pivoting movement about the pivot shaft 160a.

The elongated rod that defines the grip handle 162 includes an aperture (not shown) that receives the pivot shaft 160a with a first portion 162a of the grip handle 162 extending from one side of the pivot shaft 160a and a second portion 162b extending from an opposite side of the pivot shaft 160a. The first portion 162a is longer than the second portion 162b. The second portion 162b defines a gripping portion of the grip handle 162 with the grip handle 162 in the gripping orientation (FIG. 19).

As shown in FIG. 21, the handle assembly 114 can include an optional locking mechanism 180. The locking mechanism 180 includes a spring biased pin. Further, the locking mechanism 180 interacts with a first aperture $A_1$ and a second aperture $A_2$ in the base 160, as shown in FIGS. 18 and 19. The spring biased pin of the locking mechanism 180 extends into the first aperture $A_1$ with the grip handle 162 in the gripping orientation, and the spring biased pin of the locking mechanism 180 extends into the second aperture $A_2$ with the grip handle 162 in the stowed orientation, thereby locking the grip handle 162 in each of the respective orientations.

Fifth Embodiment

Figure 22:
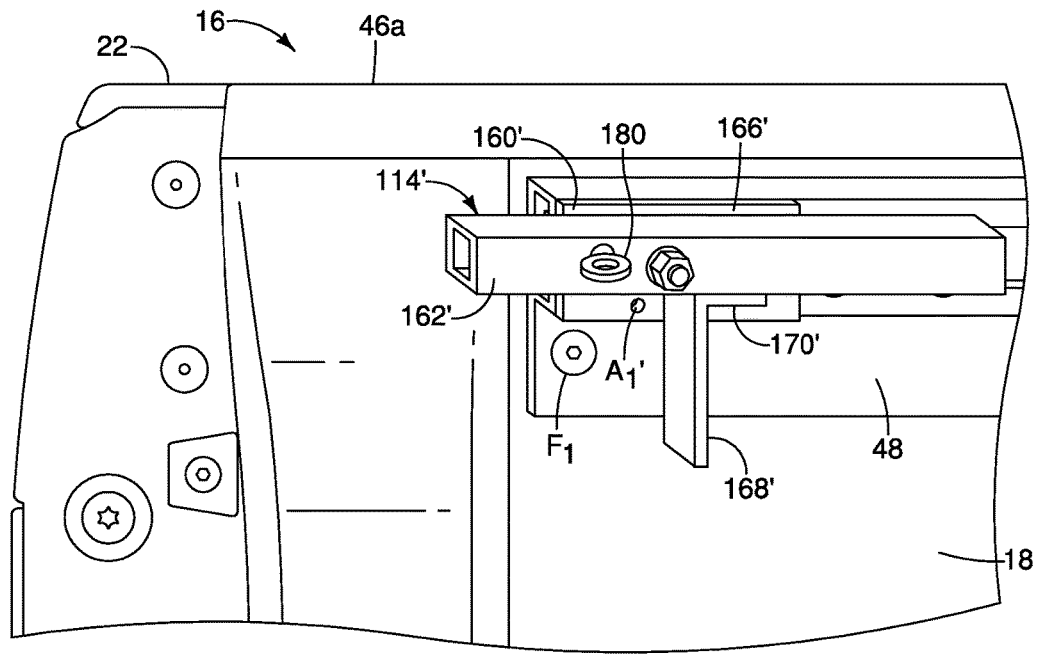
FIG. 22 is a perspective view of the first side wall and a handle assembly installed to an inner panel of the first side wall showing a grip handle of the handle assembly pivoted to the stowed orientation in accordance with a fifth embodiment.
Figure 23:
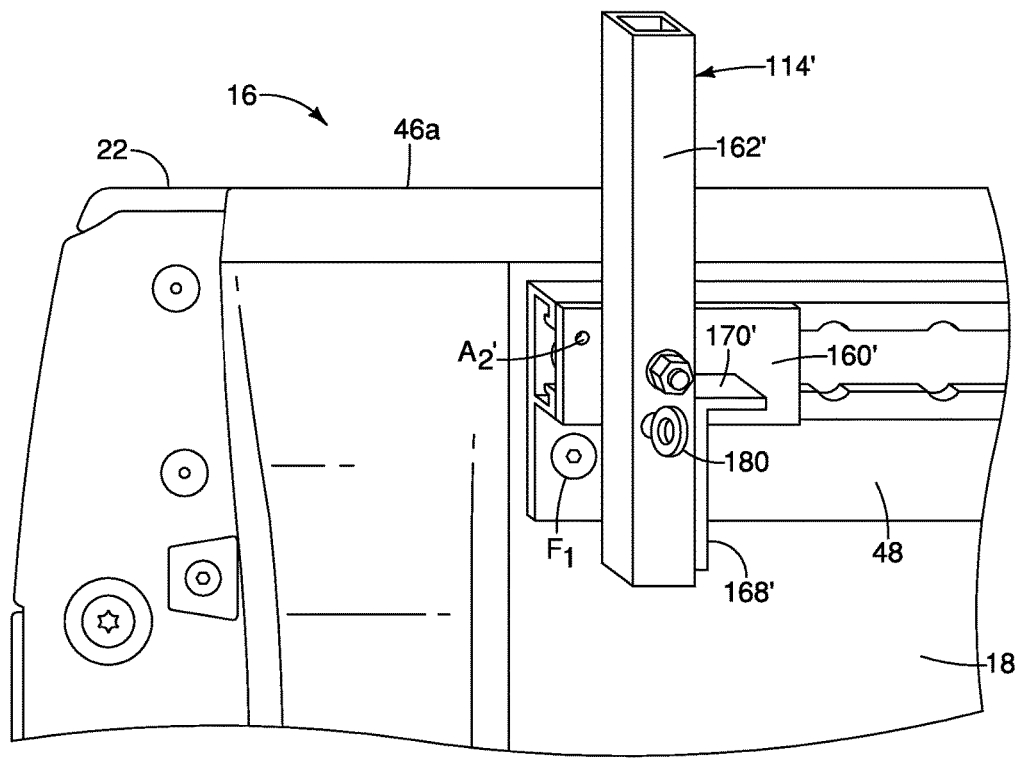
FIG. 23 is another perspective view of the first side wall and the handle assembly similar to FIG. 22, showing the grip handle of the handle assembly pivoted to the gripping orientation in accordance with the fifth embodiment.

Referring now to FIGS. 22 and 23, a handle assembly 114' in accordance with a fifth embodiment will now be explained. In view of the similarity between the first, fourth and fifth embodiments, the parts of the fifth embodiment that are identical to the parts of the first and/or fourth embodiments will be given the same reference numerals as the parts of the first and/or fourth embodiments. Moreover, the descriptions of the parts of the fifth embodiment that are identical to the parts of the first and/or fourth embodiments may be omitted for the sake of brevity. The parts of the fifth embodiment that differ from the parts of the first and/or fourth embodiments will be indicated with a single prime (').

In the fifth embodiment, the first side wall 22 is as described with respect to the first embodiment, and in particular, includes the utility track 48.

The handle assembly 114' of the fifth embodiment includes a base 160' and a grip handle 162'. The base 160' includes an attachment portion 166', a first stop portion 168' and a second stop portion 170'. The attachment portion 166 is a flat metallic plate that includes the attachment assembly 64 described above with reference to the first embodiment. The attachment assembly 64 attaches to the handle assembly 114' and attaches to the utility track 48, as is also described above with respect to the first embodiment. The first stop portion 168' and the second stop portion 170' are positioned and oriented such that the grip handle 162' is limited to pivoting movement between the first stop portion 168' and the second stop portion 170'. In the depicted fifth embodiment, the first stop portion 168' and the second stop portion 170' are perpendicular to one another, and, extend in directions perpendicular to the attachment portion 166'.

The grip handle 162' is an elongated rod that pivots about a pivot shaft 160a fixed to the base 160'. The grip handle 162' is movable (pivoting movement) relative to the base 160' between a stowed orientation (FIG. 22) in which the entire grip handle 162' is at a location lower than the upper surface 46a of the first side wall 22 and a gripping orientation (FIG. 23) in which at least a portion of the grip handle 162' extends higher that the upper surface 46a of the first side wall 22. With the grip handle 162' in the gripping orientation (FIG. 23), an individual using the step 30 to enter the cargo area 18 grabs the grip handle 162' for assistance in stepping up into the cargo area 18.

The first stop portion 168' is vertically oriented such that the grip handle 162' contacts the first stop portion 168' when in the gripping orientation (FIG. 23). The second stop portion 170' is horizontally oriented such that the grip handle 162' contacts the second stop portion 170' when in the stowed orientation (FIG. 22).

The first stop portion 168' and the second stop portion 170' are positioned such that the grip handle 162' is limited to approximately 90 degrees of pivoting movement about the pivot shaft 160a.

As shown in FIGS. 22 and 23, the handle assembly 114' can include the optional locking mechanism 180 (described above with respect to the fourth embodiment). The locking mechanism 180 interacts with a first apertures $A_1$ and a second aperture $A_2$ in the base 160', as shown in FIGS. 22 and 23. The spring biased pin of the locking mechanism 180 extends into the first aperture $A_1$ with the grip handle 162' in the gripping orientation, and the spring biased pin of the locking mechanism 180 extends into the second aperture $A_2$ with the grip handle 162' in the stowed orientation, thereby locking the grip handle 162' in each of the respective orientations.

Sixth Embodiment

Figure 24:
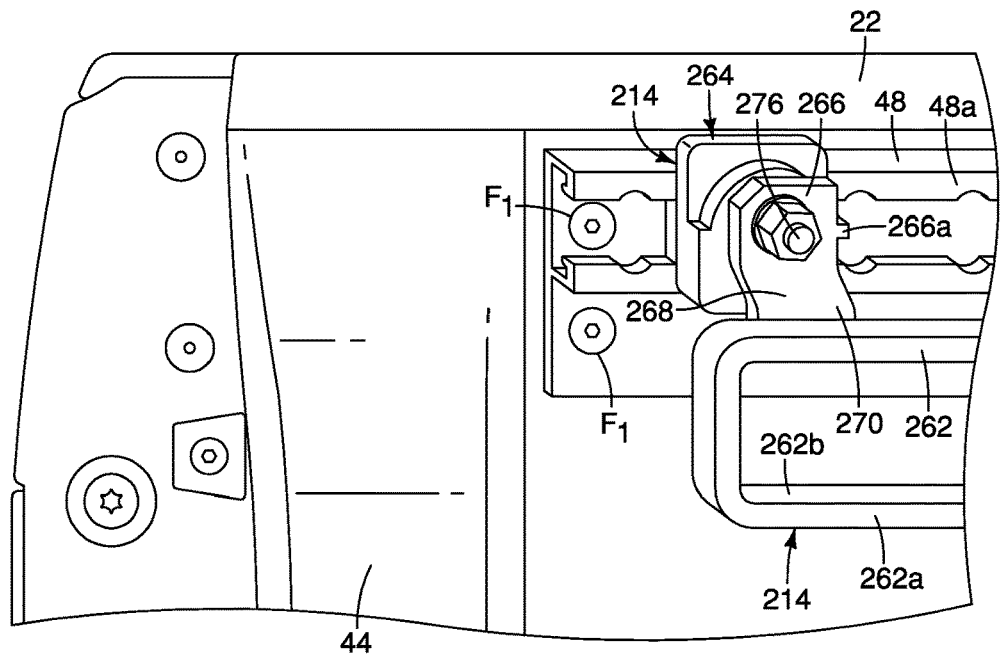
FIG. 24 is a perspective view of the first side wall and a handle assembly installed to the utility track showing a grip handle of the handle assembly pivoted to the stowed orientation in accordance with a sixth embodiment.
Figure 25:
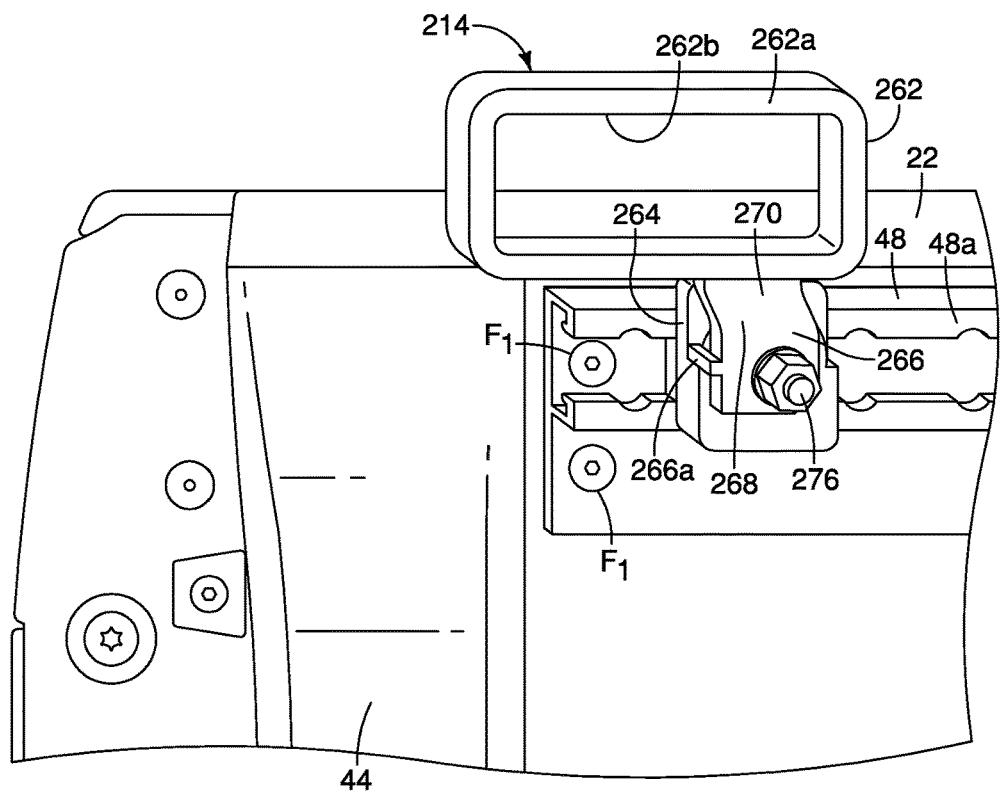
FIG. 25 is another perspective view of the first side wall and the handle assembly similar to FIG. 24, showing the grip handle of the handle assembly pivoted to the gripping orientation in accordance with the sixth embodiment.
Figure 26:
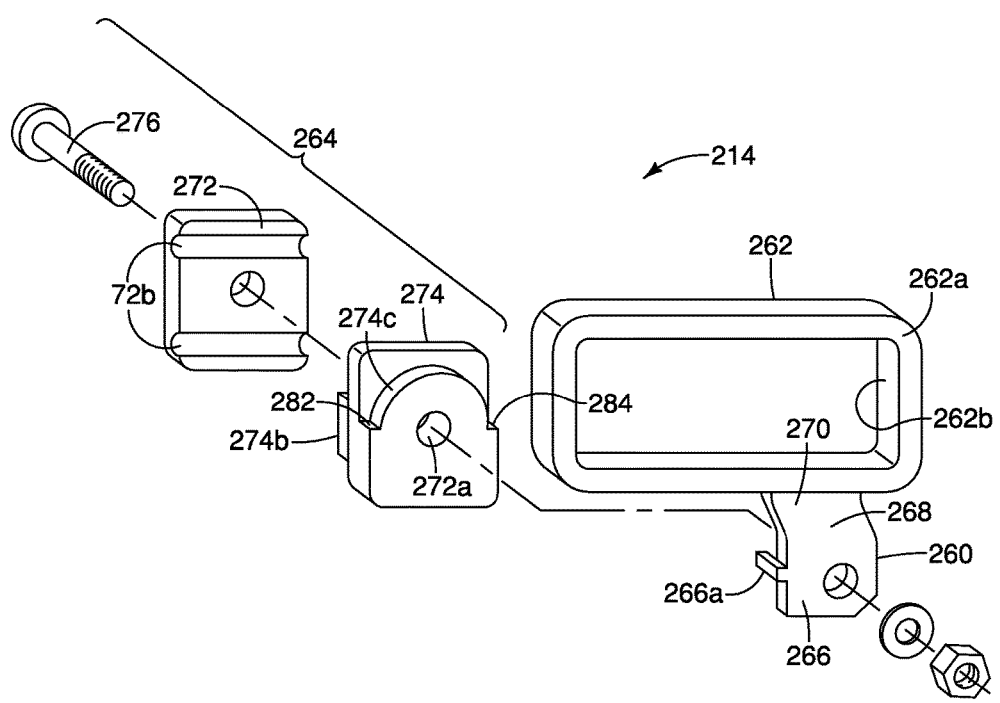
FIG. 26 is an exploded perspective view of the handle assembly removed from the utility track and the first side wall showing the grip handle, a base and an attachment assembly in accordance with the sixth embodiment.

Referring now to FIGS. 24-26, a handle assembly 214 in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

In the sixth embodiment, the handle assembly 214 replaces the handle assembly 14 of the first embodiment. More specifically, the handle assembly 214 can be installed to the utility track 48 of the first side wall 22 in a manner consistent with the handle assembly 14 of the first embodiment.

The handle assembly 214 includes a base 260 and a grip handle 262, as shown in FIGS. 24-26. The base 260 includes an attachment portion 266, a contoured portion 268 and a handle supporting portion 270. The grip handle 262 includes a rectangular shaped frame 262a that defines a central opening 262b. The rectangular shaped frame 262a is fixed to the handle supporting portion 270 such that the handle supporting portion 270 basically defines a flange extending from the rectangular shaped frame 262a in a direction away from the central opening 262b.

As shown in FIG. 26, the attachment portion 266 of the base 260 (also referred to as part of the flange extending from the grip handle 262) has an aperture that receives a pivot shaft 276 such that the grip handle 262 can pivot about the pivot shaft 276 between a stowed orientation shown in FIG. 24 and a gripping orientation shown in FIG. 25. The attachment portion 266 also includes projection 266a that extends in a direction parallel to the pivot shaft 276.

As shown in the exploded view in FIG. 26, the base 260 includes an attachment assembly 264. The attachment assembly 264 includes a clamping member 272, a clamping block 274 and the pivot shaft 276. The clamping member 272 includes the pair of grooves 72b as described above with respect to clamping member 72 of the first embodiment. The clamping block 274 includes a bore 274a, an anti-rotation block 274b and a semi-circular recess 274c. The semi-circular recess 274c defines a first stop portion 282 and a second stop portion 284. The pivot shaft 276 extends through the bore 272a, and when the pivot shaft 276 is loosened, the grip handle 262 can undergo limited pivoting movement about the pivot shaft 276. Further, the projection 266a of the attachment portion 266 extends into the semi-circular recess 274c. Pivoting or rotating movement of the grip handle 262 about the pivot shaft 276 is limited by contact between the projection 266a and each of the first stop portion 282 and the second stop portion 284.

More specifically, the first stop portion 282 and the second stop portion 284 are surfaces defined at opposing ends of the semi-circular recess 274c. The first stop portion 282 and the second stop portion 284 are positioned and oriented such that the grip handle 262 is limited to pivoting movement between the first stop portion 282 and the second stop portion 284. The first stop portion 282 and the second stop portion 284 are positioned such that the grip handle 262 is limited to approximately 180 degrees of pivoting movement about the pivot shaft 276.

With the grip handle 214 in the gripping orientation (FIG. 25), an individual using the step 30 to enter the cargo area 18 grabs the grip handle 262 for assistance in stepping up into the cargo area 18.

Seventh Embodiment

Figure 27:
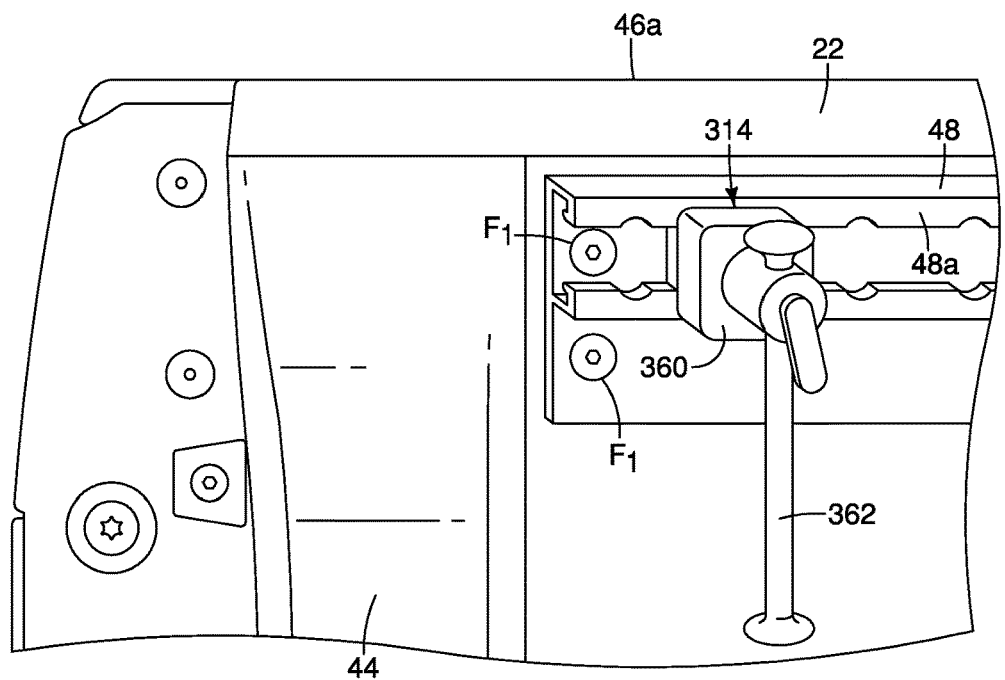
FIG. 27 is a perspective view of a rear portion of the first side panel with the utility track and a handle assembly attached to the utility track, showing a grip handle of the handle assembly in a stowed orientation in accordance with a seventh embodiment.
Figure 28:
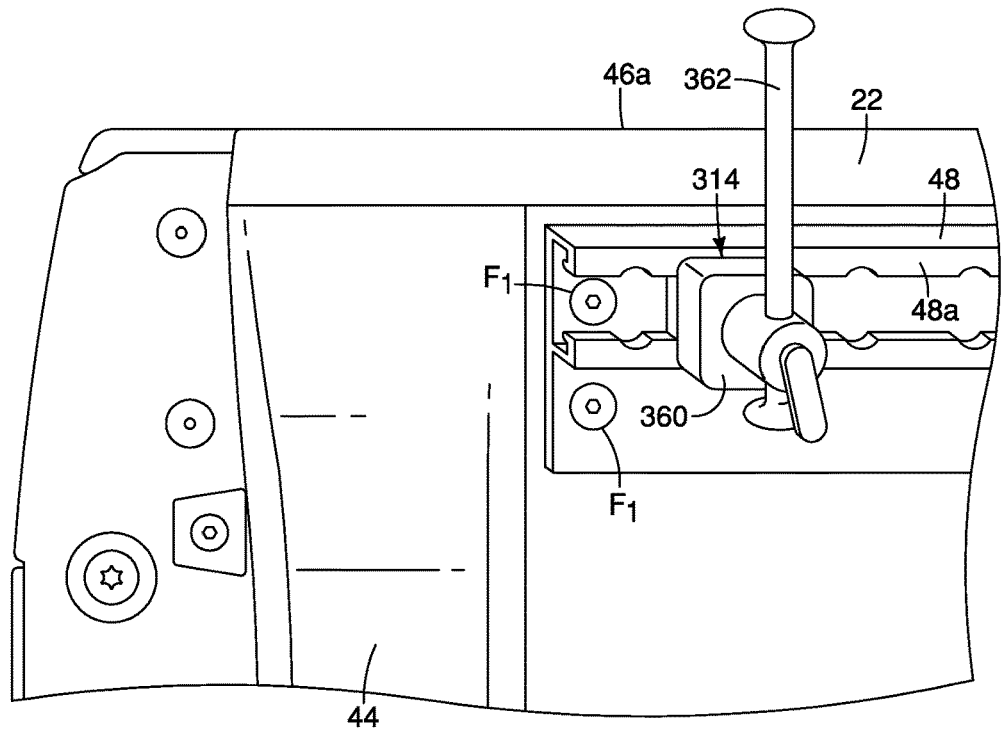
FIG. 28 is another perspective view of the rear portion of the first side panel and the handle assembly similar to FIG. 27, showing the grip handle of the handle assembly in a gripping orientation in accordance with the seventh embodiment.
Figure 29:
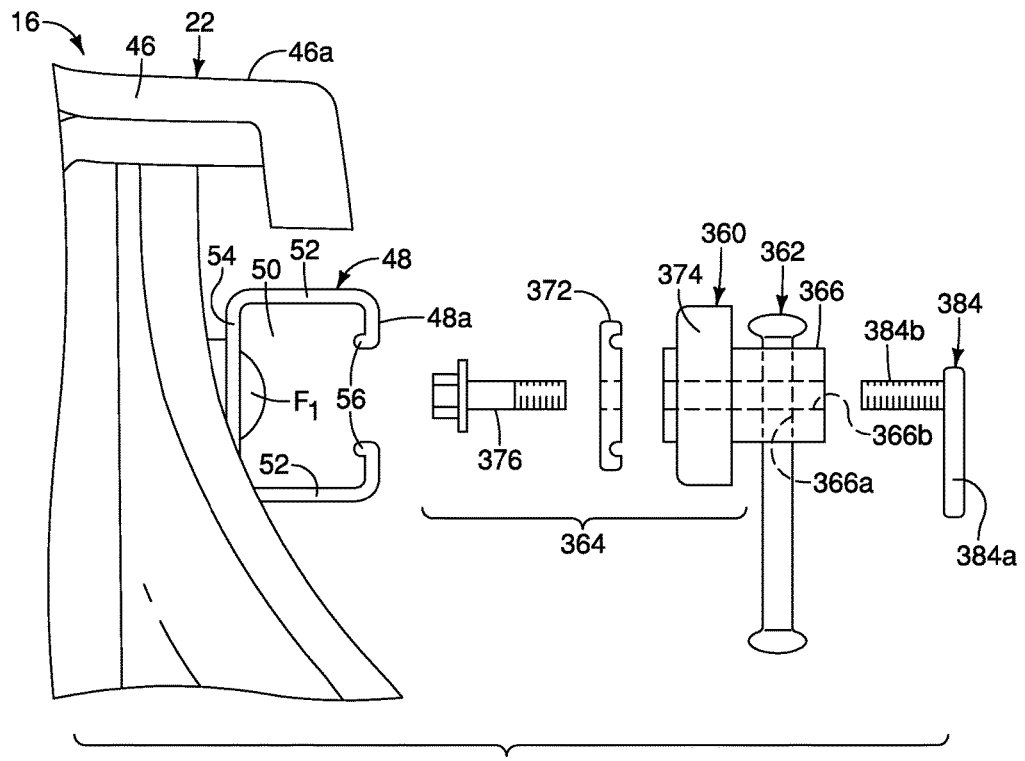
FIG. 29 is an exploded end view of the first side wall and the handle assembly showing a base and elements of an attachment assembly separated from one another and separated from the utility track in accordance with the seventh embodiment.

Referring now to FIGS. 27-29, a handle assembly 314 in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

The handle assembly 14 of the first embodiment can be interchangeably replaced with the handle assembly 314 of the seventh embodiment. Specifically, the handle assembly 314 can be installed to the utility track 48, as shown in FIGS. 27 and 28.

The handle assembly 314 has a base 360 and a grip handle 362. The base 360 is attached to the upright surface 48a of utility track 48 of the first side wall 22. The grip handle 362 is movable relative to the base 360 between a stowed orientation shown in FIG. 27 and a gripping orientation shown in FIG. 28. In the stowed orientation, the grip handle 362 is at a location lower than an upper surface 46a of the first side wall 22. In the gripping orientation, at least a portion of the grip handle 362 extends higher that the upper surface 46a of the first side wall 22 such that with the grip handle 362 in the gripping orientation, an individual using the step 30 to enter the cargo area 18 grabs the grip handle 362 for assistance in stepping up into the cargo area 18.

The base 360 includes a cylindrical block portion 366 and a clamping block 374. The cylindrical block portion 366 includes an aperture 366a and a bore 366b. The aperture 366a extends through the cylindrical block portion 366 in a direction parallel to the first side wall 22. The bore 366b extends through both the cylindrical block portion 366 and the clamping block 374 in a direction perpendicular to the aperture 366a. Further, the bore 366b is open to (intersects with) the aperture 366a.

The grip handle 362 is basically an elongated rod with oversized ends. The elongated rod that defines the grip handle 362 extends through the aperture 366a in the base 360 such that the elongated rod is movable in a vertical direction through the aperture 366a. With the elongated rod moved vertically upward to the gripping orientation (FIG. 28), the exposed section of the elongated rod defines a gripping area of the grip handle 362. With the elongated rod moved vertically downward to the stowed orientation (FIG. 27), the loser exposed section of the elongated rod can be used a gripping area of the grip handle 362, but is preferably not used as such in the stowed orientation.

The base 360 further defines an attachment assembly 364 and a clamping mechanism 384. The attachment assembly 364 includes a clamping member 372, a threaded member 376 and the clamping block 374 of the base 360. The clamping member 372 is installed into the elongated hollow channel 50 of the utility track 48, and the threaded member 376 is threadedly engaged with threads within the bore 366b of the clamping block 374 of base 360. The threaded member 376 also extends through the clamping member 372. When the threaded member 376 is tightened, the resulting force urges the clamping member 372 and the clamping block 374 of base 360 together clamping to the projections 56 of lengthwise extending walls 52 of the utility track 48.

The clamping mechanism 384 includes a handle portion 384a and a threaded portion 384b. The threaded portion 384b engages corresponding threads within the bore 366b of the base 360. When the handle portion 384a is manipulated tightening the threaded portion 384a against the grip handle 362, the clamping mechanism 384 releasably clamps the elongated rod of the grip handle 362 in one or the other of the gripping orientation and the stowed orientation.

The handle assembly 314 can be modified such that the base 360 is directly attached to the first side wall 22 via mechanical fasteners F₁ in the absence of the utility track 48.

Eighth Embodiment

Referring now to FIGS. 30-36, a handle assembly 414 installed to the cargo area structure 16 in accordance with a eighth embodiment will now be explained. In view of the similarity between the first and eighth embodiments, the parts of the eighth embodiment that are identical to the parts of the first embodiment will be given the same reference numerals as the parts of the first embodiment. Moreover, the descriptions of the parts of the eighth embodiment that are identical to the parts of the first embodiment may be omitted for the sake of brevity.

Figure 30:
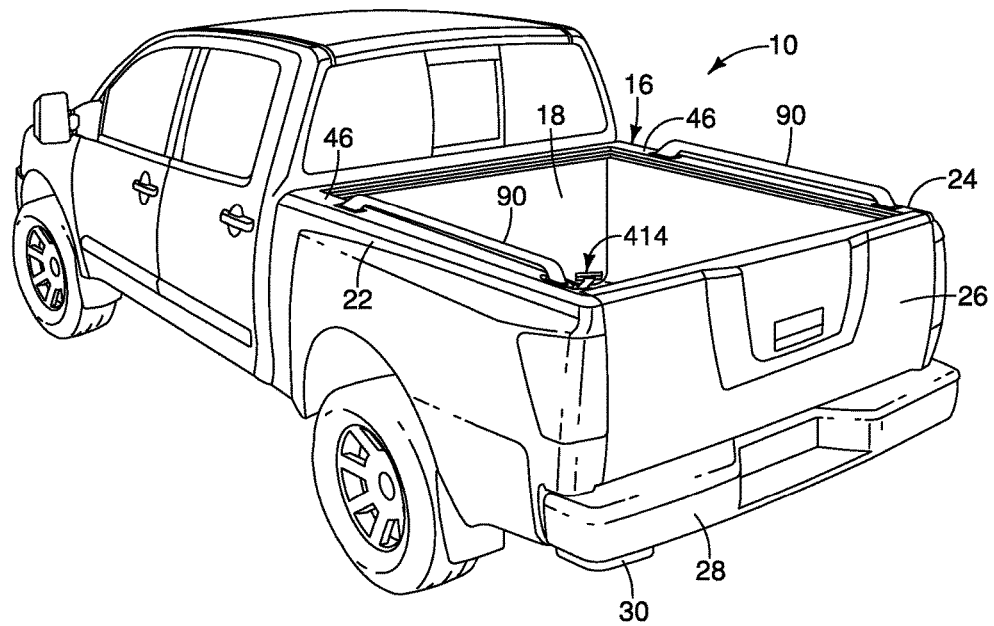
FIG. 30 is a rear perspective view of the vehicle and the cargo area structure that has been modified to include side rails installed to the first and second side walls thereof, along with a handle assembly, showing the retractable step in the retracted orientation beneath the rear corner of the bumper in accordance with an eighth embodiment.
Figure 31:
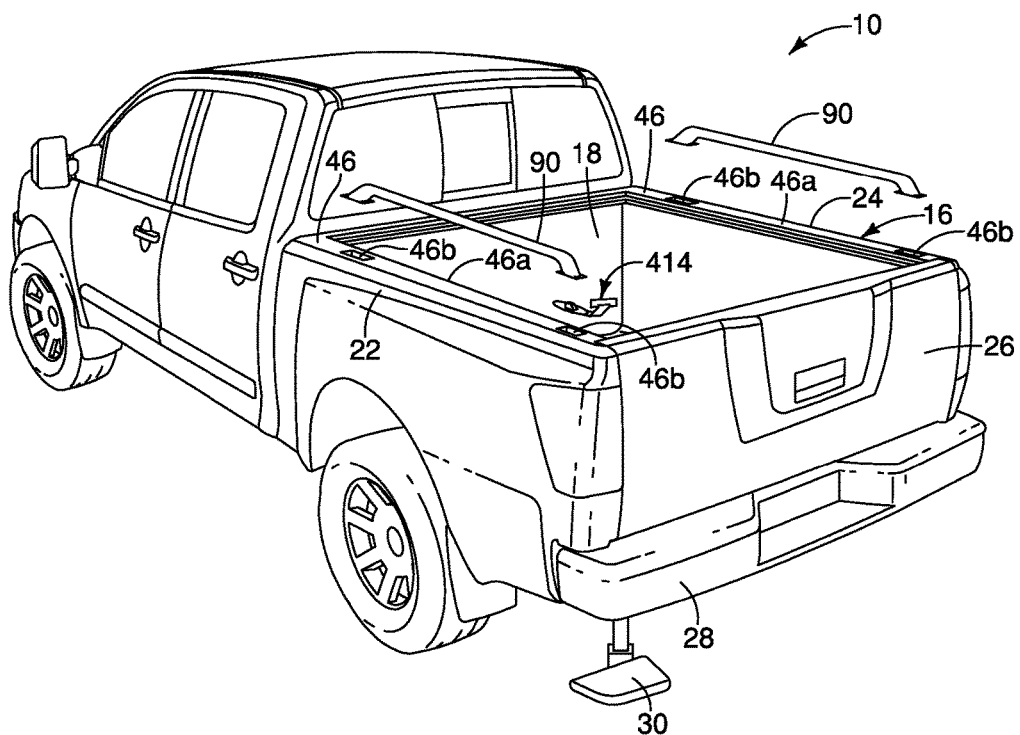
FIG. 31 is an exploded rear perspective view of the vehicle and the cargo area structure showing the side rails and the handle assembly, showing the retractable step in the extended orientation beneath the rear corner of the bumper in accordance with the eighth embodiment.

As shown in FIGS. 30 and 31 from a perspective view that differs from the views in FIGS. 1 and 2, the first side wall 22 and the second side wall 24 of the cargo area structure 16 each include openings 46b (shown in FIG. 31) defined in the upper surface 46a that extend down through of the upper panel portion 46 (openings 46b are not visible in FIGS. 1 and 2). The openings 46b are located at forward and rearward portions of the upper panel portion 46 of each of first side wall 22 and the second side wall 24, as shown in FIG. 31. A pair of side rails 90 are mounted to the upper panel portion 46 of each of the first side wall 22 and the second side wall 24 using the openings 46b, as described in greater detail. Consequently, respective ends of each of the side rails 90 cover corresponding ones of the openings 46b, as shown in FIG. 30.

The retractable step 30 installed to the cargo area structure 16 beneath the floor 20 and the first side wall 22, and, adjacent to the tailgate 26, as described above with respect to the first embodiment. In FIG. 30 the retractable step 30 is shown in the retracted orientation. In FIG. 31, the retractable step 30 is shown in the extended orientation.

The handle assembly 414 is now described with specific reference to FIGS. 32-36. The handle assembly 414 includes a base 460 and a grip handle 462 that is fixedly attached to the base 460. The base 460 attaches to the upper panel portion 46 of the first side wall 22 via an attachment assembly 464 that is described in greater detail below. The base 460 includes an attachment portion 466, a contoured portion 468 and a handle supporting portion 470.

Figure 32:
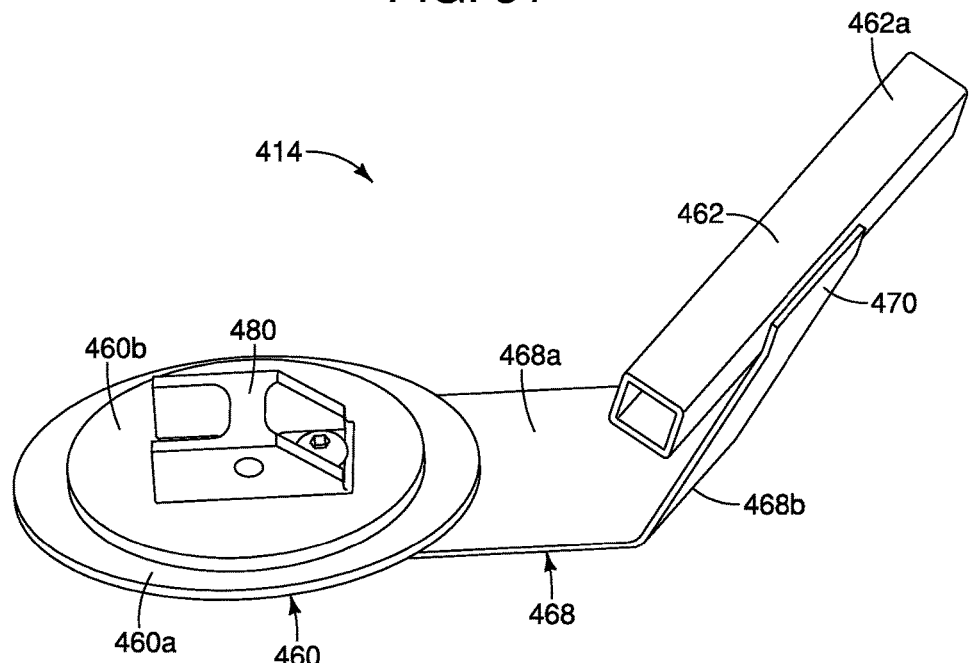
FIG. 32 is a perspective view of the handle assembly removed from the vehicle showing a base and a grip handle in accordance with the eighth embodiment.
Figure 33:
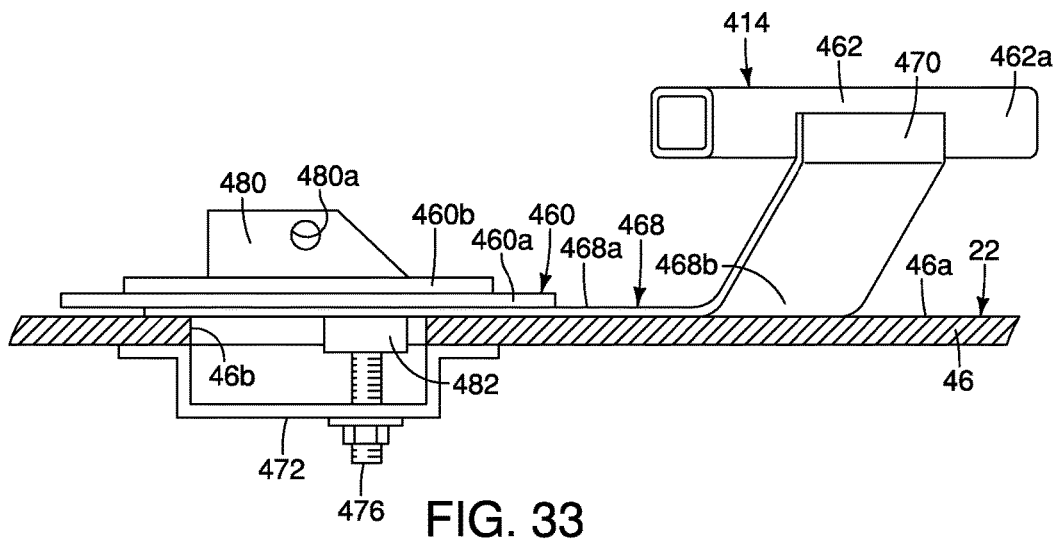
FIG. 33 is a cross-sectional view of an outboard side of a rear section of the first side wall showing the handle assembly installed to the first side wall in accordance with the eighth embodiment.
Figure 34:
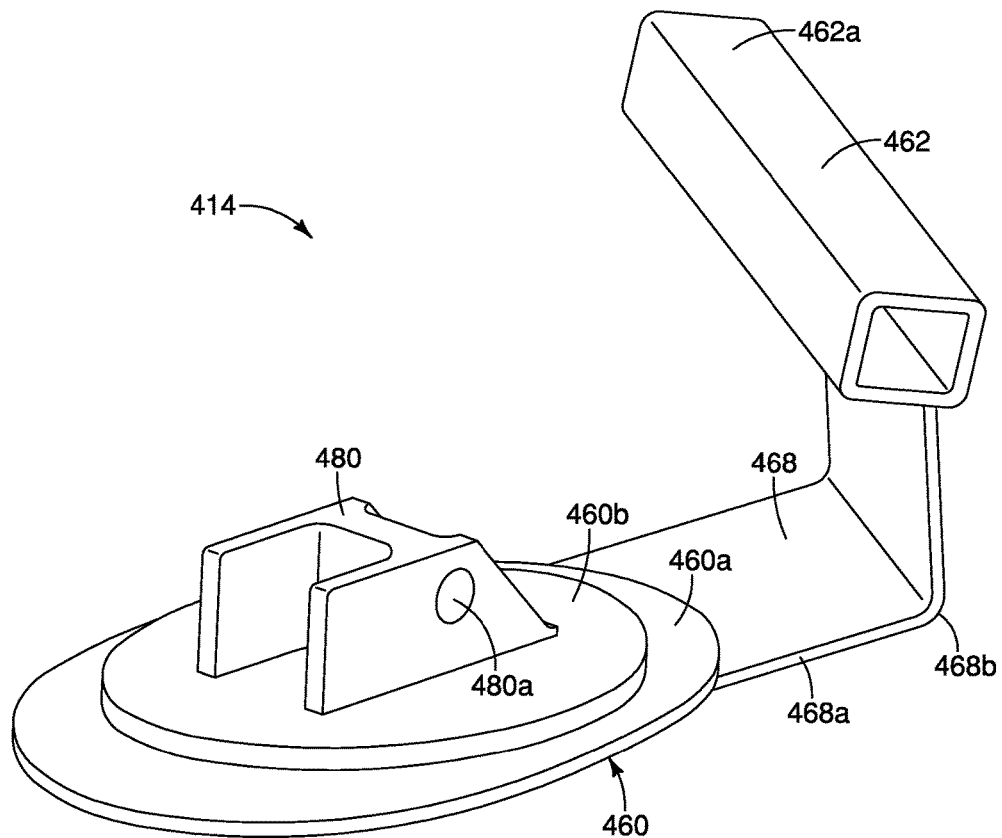
FIG. 34 is another perspective view of the handle assembly removed from the vehicle showing the base and the grip handle in accordance with the eighth embodiment.
Figure 35:
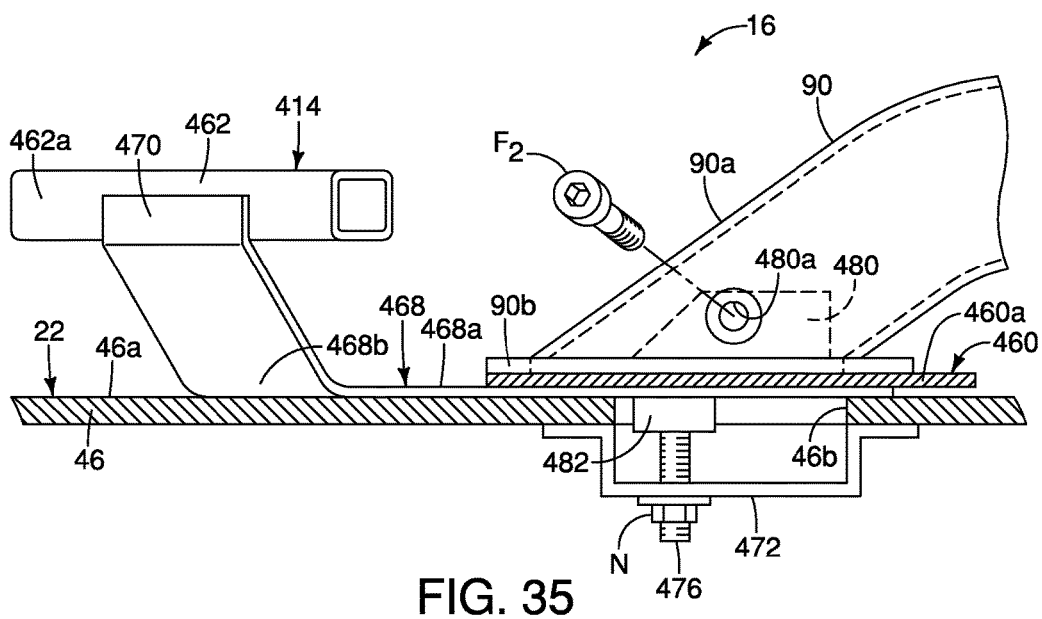
FIG. 35 is a cross-sectional view of an inboard side of the rear section of the first side wall showing the handle assembly and one of the side rails installed to the first side wall in accordance with the eighth embodiment.

The attachment portion 466 of the base 460 includes an oval shaped panel 460a, a centering panel 460b, an upper block 480 shown in FIGS. 32-34 and a lower block 482 shown in FIGS. 33 and 35. The centering panel 460b is fixedly attached to the oval shaped panel 460a via, for example, welding, and is used to align and position the side rail 90 to the handle assembly 414 when installed to the first side wall 22. The upper block 480 is further fixedly attached to the centering panel 460b. The lower block 482 is fixedly attached to an underside of the base 460.

Figure 36:
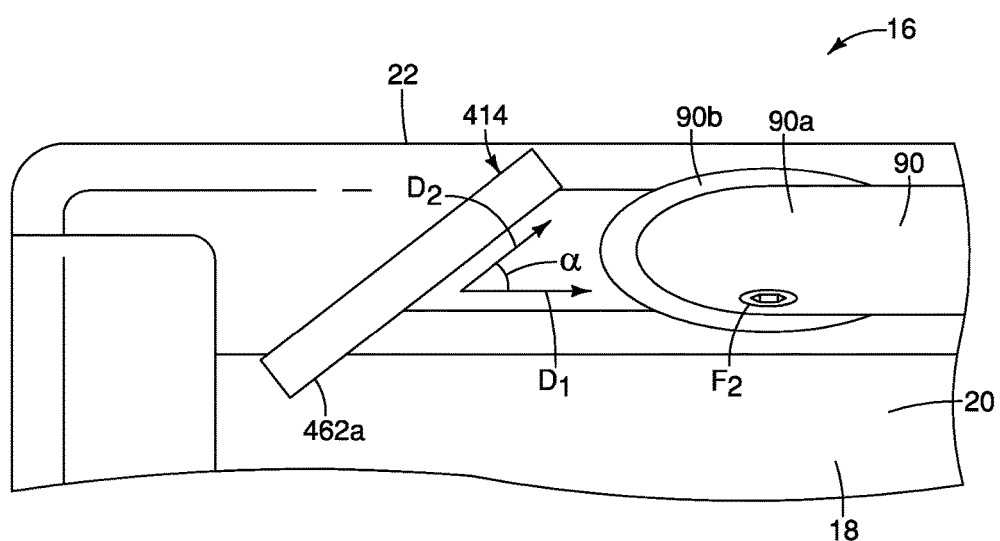
FIG. 36 is a top view of an inboard side of the rear section of the first side wall showing the handle assembly and one of the side rails installed to the first side wall in accordance with the eighth embodiment.

The oval shaped panel 460a is dimensioned to cover a rearward one of the openings 48b in the first side wall 22, when the base 460 is attached to the first side wall 22, as shown in FIG. 30. The contoured portion 468 is a metal material that includes a first section 468a that extends from beneath the oval shaped panel 460a, in a direction parallel to the upper surface 46a of the first side panel 22, as shown in FIGS. 33, 35 and 36. The contoured portion 468 includes a bend 468b that angles the handle supporting portion 470 upward. Specifically, the handle supporting portion 470 extends upward and away from the first section 468a. A distal end of the handle supporting portion 470 is vertically higher than the oval shaped panel 460a.

The grip handle 462 is fixedly attached to the distal end (upper end) of the handle supporting portion 470 via, for example, welding techniques or mechanical fasteners (not shown). Hence, the grip handle 462 is positioned above the base 460 and above the upper surface 46a of the first side wall 22 when installed to the first side wall 22. As shown in FIG. 36, a gripping portion 462a of the grip handle 462 is elongated such that the gripping portion 462a extends over the floor 20 of the cargo area 18, inboard of the first side wall 22.

Further, as shown in FIG. 36, the first side wall 22 extends in a first direction $D_1$, and the grip handle 462 extends in a second direction $D_2$. The first direction $D_1$ and the second direction D1 define an acute angle α therebetween. The angle α is preferably between 20 and 60 degrees. Still further, the angle α can be 30 degrees, 35 degrees, 40 degrees, 45 degrees, or any value between 20 and 60 degrees. In the depicted embodiment, the angle α is 40 degrees, as shown in FIG. 36.

The attachment assembly 464 fixedly attaches the base 460 to the first side wall 22, as shown in FIGS. 33 and 35. The attachment assembly 464 includes a clamping member 472 and a threaded member 476. The clamping member 472 is a U-shaped member that is wider than the openings 46b. The threaded member 476 is threadedly engaged with or welded to the lower block 482.

When installed to the first side wall 22, the oval shaped panel 460a of the base 460 of the handle assembly 414 is positioned over the opening 46b such that the lower block 482 extends through the opening 46b, as shown in FIGS. 33 and 35. The clamping member 472 is positioned below the upper panel portion 46 of the first side wall 22 with the threaded member 476 extending through an aperture of the clamping member 472. The clamping member 472 is urged against to the lower side of the upper panel portion 46 of the first side wall 22 by tightening of a threaded nut N on the threaded member 476 and against a lower surface of the clamping member 472. Tightening of the nut N against the clamping member 472 further urges the base 460 against the upper surface 46a of the upper panel portion 46 of the first side wall 22. Hence, the clamping member 472 and the base 460 of the handle assembly 414 clamp to the upper panel portion 46 of the first side wall 22.

The oval shaped panel 460a of the base 460 overlays a corresponding portion of the upper surface 46a of the first side wall 22 surrounding the opening 46b. Once installed to the first side wall 22, the grip handle 462 is positioned such that an individual using the step 30 to enter the cargo area 18 grabs the grip handle 462 for assistance in stepping up into the cargo area 18.

With the handle assembly 414 installed to the rearward one of the opening 46b of the first side wall 22, a rearward end of the side rail 90 is fixed to the handle assembly 414 with a fastener $F_2$ that is inserted into an aperture in the side of the side rail 90 and further through an opening 480a in the upper block 480 (a side rail attachment block), as shown in FIGS. 35 and 36. The forward end of the side rail 90 is attached to the forward area of the first side wall 22 using an attachment assembly (not shown) that is similar to the attachment assembly 464. Further, alternative conventional attachment devices can be used to attach the forward end of the side rail 90 to the first side wall 22. Since alternative conventional attachment devices are well known in the art, further description of attachment of the forward end of the side rails 90 is omitted for the sake of brevity.

The vehicle body structure 10 and the cargo area structure 16 (other than the handle assemblies and related structures described above) include conventional components that are well known in the art. Since such conventional components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also, as used herein to describe the above embodiments, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The term "configured" as used herein to describe a component, section or part of a device that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle body structure, comprising:
   a vehicle cargo structure having a floor, a first side wall and a tailgate at least partially defining a cargo area, the tailgate being movable between an open orientation exposing a rear end of the cargo area and a closed orientation blocking the rear end of the cargo area, an upper surface of the first side wall having at least one opening defined therein;

a retractable step installed to the vehicle cargo area structure beneath the floor and the first side wall and adjacent to the tailgate; and a handle assembly having a base and a grip handle fixedly attached to the base, the base including a panel that overlays a corresponding portion of the upper surface of the first side wall and an attachment assembly that extends downward from the panel through the at least one opening in upper surface of the first side wall, the attachment assembly being fixedly attached to the first side wall thereby non-movably attaching the grip handle to the first side wall, with a first portion of the grip handle extending inboard over the floor of the cargo area, such that an individual using the step to enter the cargo area grabs the grip handle for assistance in stepping up into the cargo area.

2. The vehicle body structure according to claim 1, wherein the attachment assembly includes a threaded member and a clamping member that is positioned beneath the upper surface of the first side wall, with the threaded member extending between the clamping member and the panel of the base of the handle assembly such that the clamping member and the base are non-movably clamped to the first side wall along the upper surface of the first side wall.

3. The vehicle body structure according to claim 2, wherein the panel of the base includes an attachment portion, a contoured portion and a handle supporting portion, the attachment portion overlying the panel, the contoured portion extending upward and away from the panel and the attachment portion such that the handle supporting portion is located above the attachment portion with the grip handle being rigidly and fixedly attached to the handle supporting portion.

4. The vehicle body structure according to claim 3, wherein the first side wall extends in a first direction, the grip handle of the handle assembly extends in a second direction such that the first direction and the second direction define an acute angle therebetween.

5. The vehicle body structure according to claim 4, wherein the acute angle is between 30 and 60 degrees.

6. The vehicle body structure according to claim 5, wherein the acute angle is 45 degrees.

7. The vehicle body structure according to claim 3, wherein the attachment portion of the base includes a side rail attachment block that extends upward from the attachment portion.

8. The vehicle body structure according to claim 7, further comprising a side rail having a rear end, a forward end and a bar portion extending from the rear end to the forward end, the rear end being connected to the side rail attachment block via a mechanical fastener, and the forward end of the side rail being fixed to a forward area of the upper surface of the first side wall.

9. The vehicle body structure according to claim 1, wherein the first side wall extends in a first direction, the grip handle of the handle assembly extends in a second direction such that the first direction and the second direction define an acute angle therebetween, the acute angle being between 30 and 60 degrees.

10. The vehicle body structure according to claim 9, wherein the acute angle is 45 degrees.

11. The vehicle body structure according to claim 1, wherein the retractable step is moveable between a retracted orientation in which the step is partially concealed below the floor and the first side wall, and an extended orientation in which the step extends rearward and outboard away relative to the cargo area.

12. The vehicle body structure according to claim 1, wherein the grip handle of the handle assembly is positioned such that with the tailgate in the open orientation, an individual using the step to enter the cargo area grabs the grip handle for assistance in stepping up into the cargo area and stepping on to the tailgate.

13. The vehicle body structure according to claim 1, wherein a second portion of the grip handle extends above the upper surface of the first side, the second portion being fixed to the base.

14. A vehicle body structure, comprising:

a vehicle cargo structure having a floor, a first side wall and a tailgate at least partially defining a cargo area, the tailgate being movable between an open orientation exposing a rear end of the cargo area and a closed orientation blocking the rear end of the cargo area, an upper surface of the first side wall having rearward opening and a forward opening defined therein;

a retractable step installed to the vehicle cargo area structure beneath the floor and the first side wall and adjacent to the tailgate;

a handle assembly having a base and a grip handle fixedly attached to the base, the base being fixedly attached to the first side wall with a portion of the base overlaying a corresponding portion of the upper surface of the first side wall with an attachment assembly extending through the rearward opening in upper surface of the first side wall with a first portion of the grip handle extending inboard over the floor of the cargo area, such that an individual using the step to enter the cargo area grabs the grip handle for assistance in stepping up into the cargo area; and a side rail having a rear end, a forward end and a bar portion extending from the rear end to the forward end, the rear end being connected to the base of the handle assembly, and the forward end of the side rail being fixed to a forward area of the upper surface of the first side wall covering the forward opening.

15. The vehicle body structure according to claim 14, wherein the attachment assembly includes a threaded member and a clamping member that is positioned beneath the rearward surface of the first side wall, with the threaded member extending between the clamping member and the base of the handle assembly such that the clamping member and the base are non-movably clamped to the first side wall along the upper surface of the first side wall.

16. The vehicle body structure according to claim 15, wherein the base includes an attachment portion, a contoured portion and a handle supporting portion, the attachment portion overlying the corresponding portion of the upper surface of the first side wall, the contoured portion extending upward and away from the attachment portion such that the handle supporting portion is located above the attachment portion with the grip handle being rigidly and fixedly attached to the handle supporting portion, and the first side wall extends in a first direction, the grip handle of the handle assembly extends in a second direction such that the first direction and the second direction define an acute angle therebetween.

17. The vehicle body structure according to claim 16, wherein the acute angle is between 30 and 60 degrees.

18. The vehicle body structure according to claim 17, wherein the acute angle is 45 degrees.

19. The vehicle body structure according to claim 16, wherein the attachment portion of the base includes a side rail attachment block that extends upward from the attachment portion.

20. The vehicle body structure according to claim 19, further comprising a side rail having a rear end, a forward end and a bar portion extending from the rear end to the forward end, the rear end being connected to the side rail attachment block via a mechanical fastener, and the forward end of the side rail being fixed to a forward area of the upper surface of the first side wall.

\* \* \* \* \*